US012730041B2

(12) United States Patent
Benner et al.

(10) Patent No.: US 12,730,041 B2
(45) Date of Patent: Sep. 8, 2026

(54) APPARATUS AND METHODS FOR DEPOSITING IONS ONTO A SURFACE

(71) Applicant: ION DX, INC., Monterey, CA (US)

(72) Inventors: W. Henry Benner, Carmel, CA (US); Ben Aguilar, Monterey, CA (US)

(73) Assignee: ION DX, INC., Monterey, CA (US)

(*) Notice: Subject to any disclaimer, the term of this patent is extended or adjusted under 35 U.S.C. 154(b) by 294 days.

(21) Appl. No.: 18/661,104

(22) Filed: May 10, 2024

(65) Prior Publication Data

US 2024/0319054 A1 Sep. 26, 2024

Related U.S. Application Data

(63) Continuation of application No. PCT/US2022/081328, filed on Dec. 10, 2022.

(60) Provisional application No. 63/291,441, filed on Dec. 19, 2021, provisional application No. 63/288,478, filed on Dec. 10, 2021.

(51) Int. Cl.
*G01N 1/42* (2006.01)

(52) U.S. Cl.
CPC .................................... *G01N 1/42* (2013.01)

(58) Field of Classification Search
CPC ...... G01N 1/42; G01N 1/2813; G01N 27/623; H01J 49/165
USPC ........................................................ 250/310
See application file for complete search history.

(56) References Cited

U.S. PATENT DOCUMENTS 5,076,097 A 12/1991 Zarrin
9,666,423 B2 5/2017 Benner
10,204,774 B2 2/2019 Benner
10,876,202 B2 12/2020 Verbeck, IV
11,037,777 B2 6/2021 Cooks
11,092,523 B2 8/2021 Coon
11,217,425 B2 1/2022 Straw
11,333,629 B2 5/2022 Benner
11,796,505 B2 10/2023 Benner
2001/0035494 A1 11/2001 Scalf
2015/0200083 A1* 7/2015 Brown .................... H01J 49/10 250/288
2015/0340221 A1 11/2015 Benner
2017/0263427 A1 9/2017 Benner (Continued)

FOREIGN PATENT DOCUMENTS

EP 0746751 12/1996
EP 1380045 1/2004

(Continued)

OTHER PUBLICATIONS

Badu-Tawiah, Abraham K., et al., "Ambient Ion Soft Landing", Analytical Chemistry, ACS Publishing, 2011, pp. 2648-2654.

(Continued)

*Primary Examiner* — Kiet T Nguyen

(74) *Attorney, Agent, or Firm* — O'BANION & RITCHEY LLP; John P. O'Banion

(57) ABSTRACT

Apparatus and methods are described for preparing samples for examination by cryo-electron microscopy. Molecules of interest, such as protein molecules in a solution, are electrosprayed and converted to singly-charged gas-phase ions. Particular conformation(s) of the protein ions are selected by using an ion mobility filter and deposited onto a cryo-EM grid at sub-eV kinetic energy for the purpose of preserving the molecule's higher order structure.

19 Claims, 31 Drawing Sheets

(56) References Cited

U.S. PATENT DOCUMENTS

| | | | |
|---|---|---|---|
| 2018/0002806 A1 | 1/2018 | Verbeck, IV | |
| 2019/0086423 A1 | 3/2019 | Jarrold | |
| 2020/0158607 A1 | 5/2020 | Coon | |
| 2021/0278369 A1 | 9/2021 | Benner | |
| 2022/0276201 A1 | 9/2022 | Benner | |

FOREIGN PATENT DOCUMENTS

| | | |
|---|---|---|
| GB | 2441200 A | 2/2008 |
| WO | 2022155306 A1 | 7/2022 |
| WO | 2023108163 A1 | 6/2023 |

OTHER PUBLICATIONS

Deng, Zhitao, et al., "A Close Look at Proteins: Submolecular Resolution of Two-and-Three-Dimensionally Folded Cytochrome c at Surfaces", Nano Letters, ACS Publications, 2012, pp. 2452-2458.
Esser, Tim K,, et al., "Mass-selective and ice-free cryo-EM protein sample preparation via native electrospray ion-beam deposition", https://www.biorxiv.org/content/10.1101/2021.10.18.464782v1, Oct. 19, 2021, pp. 1-29.
Esser, Tim K,, et al., "Mass-selective and ice-free cryo-EM protein sample preparation via native electrospray ion- beam deposition", https://www.biorxiv.org/content/10.1101/2021.10.18.464782v1, Oct. 19, 2021, pp. 1-9.
Franchetti, V., et al., "Soft Landing of IONS as a Means of Surface Modification", International Journal of Mass Spectrometry and Ion Physics, vol. 23, 1977, pp. 29-35.
Hoffman, William, et al., "Toward a Reusable Surface-Enhanced Raman Spectroscopy (SERS) Substrate by Soft-Landing Ion Mobility", Applied Spectroscopy, vol. 67, No. 6, 2013, pp. 656-660.
Johnson, Grant E., et al., "Soft-and Reactive Landings of IONS Onto Surfaces: Concepts and Applications", Mass Spectroscopy Reviews, vol. 35, 2016, pp. 439-479.
Li, Chengjue, et al., "Determining Ultrafine Particle Collection Efficiency in a Nanometer Aerosol Sampler", Aerosol Science and Technology, vol. 44, 2010, pp. 1027-1041.
Longchamp, Jean-Nicolas, et al., "Imaging proteins at the single-molecule level", www.pnas.org/cgi/doi/10.1073/pnas.1614519114, Dec. 13, 2026, pp. 1-6.
Mikhailov, Victor A., et al., "Mass-Selective Soft Landing of Protein Assemblies with Controlled Landing Energies", Analytical Chemistry, ACS Publications, 2014, pp. 8321-8328.
Nasibulin, Albert G., et al., "TEM imaging of mass-selected polymer molecules", Journal of Nanoparticle Research, vol. 4, 2002, pp. 449-453.
Ochner, Hannah, et al., "Low-energy holography imaging of conformational variability of single-antibody molecules from elecrospray ion beam deposition", PNAS, vol. 118, No. 51, 2021, pp. 1-8.
Rawat, Vivek K., et al., "Modeling vapor uptake induced mobility shifts in peptide ions observed with transversal modulation ion mobility spectrometry-mass spectrometry", Royal Society of Chemistry, Analyst, vol. 140, 2015, pp. 6945-6954.
Tata, Alessandra, et al., "From vacuum to atmospheric pressure: A review of ambient ion soft landing", International Journal of Mass Spectrometry, vol. 450, 2020, pp. 1-11.
Volnay, Michael, et al., "Preparative Soft and Reactive Landing of Multiply Charged Protein Ions on a Plasma-Treated Metal Suface", Analytical Chemistry, vol. 77, No. 15, 2005, pp. 4890-4896.
Walton, Barbara, L., et al., "Sub-eV ion deposition utilizing soft-landing ion mobility for controlled ion, ion cluster, and charged nanoparticle deposition", International Journal of Mass Spectrometry, vol. 370, 2014, pp. 66-74.
Walz, Andreas, et al., "Navigate flying molecular elephants safely to the ground: mass-selective soft landing up to the Mega-Dalton range by Electrospray Controlled lon-Beam Deposition", Beilstein Journal of Nanotechnology, vol. 6, 2015, pp. 1927-1934.
Westphall, Michael S., et al., "Three-dimensional structure determination of protein complexes using matrix-landing mass spectrometry", Nature Communications, https://doi.org/10.1038/s41467-022-29964-4, vol. 13, Apr. 27, 2022, pp. 1-6.
Xiang, Maiqi, et al., "Airborne nanoparticle collection efficiency of a TEM grid-equipped sampling system", Aerosol Science and Technology, Jan. 22, 2021, pp. 1-14.
Frederik, Peter M., et al., "Controlled Vitrification", Handbook of Cyro-Preparation Methods for Electron Microscopy, Chapter 4, Jan. 2009, pp. 1-12.
ISA/US, United States Patent and Trademark Office (USPTO), International Search Report and Written Opinion issued Mar. 15, 2023, related PCT international application No. PCT/US2022/081328, pp. 1-10, with claims searched, pp. 11-15.
Wyttenbach, Thomas, et al., "Design of a new electrospray ion mobility mass spectrometer", International Journal of Mass Spectromtry, vol. 212, 2001, pp. 13-23.
Wang, Peng, et al., "Helical Peptide Arrays on Self-Assembled Monolayer Surfaces Through Soft and Reactive Landing of Mass-Selected lons", OSTI.gov, A Journal of the German Chemical Society, Aug. 11, 2008,.
Rinke, G., S Rauschenbach, L Harnau, A Albarghash, M Peuly and K Kern, Nano Letters DOI 10.1021/nl502122j, 2014.
Page, Jason S., et al., Journal of American Society Mass Spectromtry, vol. 17, No. 4, 2006, pp. 586-592.
Ouyang, Zheng, et al., "Preparing Protein Microarrays by Soft-Landing of Mass-Selected lons", Science, vol. 301, Sep. 5, 2003, pp. 1351-1354.
Tang, Keql, et al., "High-Sensitivity Ion Mobility Spectrometry/Mass Spectrometry Using Electrodynamic lon Funnel Interfaces", Analytical Chemistry, vol. 77, No. 10, 2005, pp. 3330-3339.
Kim, Taeman, et al., "Design and Implementation of a New Electrodynamic lon Funnel", Analytical Chemistry, vol. 72, No. 10, 2000, pp. 2247-2255.
Kaufman, Stanley, L., et al., "Macromolecule Analysis Based on Electrophoretic Mobility in Air: Globular Proteins", Analytical Chemistry, vol. 68, 1996, pp. 1895-1904.
Julian, Ryan R., et al., "lon Funnels for the Masses: Experiments and Simulations with a Simplified Ion Funnel", American Society for Mass Spectrometry, 2005, pp. 1708-1712.
Hogan, Christopher J., "Charge Reduced Electrospray Size Spectrometry of Mega-and Gigadalton Complexes: Whole Viruses and Virus Fragments", Analytical Chemistry, vol. 78, No. 3, 2006, pp. 844-852.
Golongan, B, et al., 2006 in Laskin J and C Lifshitz C, Eds., Principles of mass spectrometry applied to biomolecules, John Wiley& Sons., Inc., Hoboken, NJ.
Fernandez de la Mora, Juan, et al., "The potential differential mobility analysis coupled to MS for the study of very large singly and multiply charged proteins and protein complexes in the gas phase", Biotechnology Journal, vol. 1, 2006, pp. 988-997.
Clowers, Brian H., et al., "Enhanced lon Utilization Efficiency Using an Electrodynamic Ion Funnel Trap as an Injection Mechanism for Ion Mobility Spectrometry", Analytical Chemistry, vol. 80, 2008, pp. 612-623.
Chaudhary, A., et al., "A novel planar ion funnel design for miniature ion optics", Review of Scientific Instruments, vol. 85, No. 10, 2014, pp. 1-6.
Blake, Thomas A., et al., "Preparative Linear Ion Trap Mass Spectrometer for Separation and Collection of Purified Proteins and Peptides in Arrays Using lon Soft Landing", Analytical Chemistry, vol. 76, 2004, pp. 6293-6305.
Simmons, Justin L.P., et al., "Separating and visualising protein assemblies by means of preparative mass spectrometry and microscopy", Journal of Structural Biology, vol. 172, 2010, pp. 161-168.
Belov, Mikhail, E., et al., "Dynamically Multiplexed Ion Mobility Time-of-Flight Mass Spectrometry", Analytical Chemistry, vol. 80, No. 15, 2008, pp. 5873-5883.
Baker, Erin Shammel, et al., "Ion Mobility Spectrometry-Mass Spectrometry Performance Using Electrodynamic Ion Funnels and Elevated Drift Gas Pressures", Journal of American Society of Mass Spectrom, vol. 18, 2007, pp. 1176-1187.

(56) References Cited

OTHER PUBLICATIONS

European Patent Office (EPO), Communication (Extended European Search Report) issued Dec. 8, 2025, related European patent application No. 22905443.2, pp. 1-26, with claims searched, pp. 27-31.

Cavalier, Annie, et al., "Cryo-Preparation Methods for Electron Microscopy", Methods in Visualization Series, CRC Press, 2009, pp. 1-31.

IPEA/US, United States Patent and Trademark Office, International Preliminary Report on Patentability issued Jun. 5, 2024, related PCT international application No. PCT/US2022/081328, pp. 1-8, with claims examined, pp. 9-13.

Ayodeji, Ifeoluwa, "Differential Mobility Spectrometry-Mass spectrometry (DMS-MS) for Forensic and Nuclear-Forensic applications" (2020), USF Tampa Graduate Theses and Dissertations. https://digitalcommons.usf.edu/etd/8918. 124 pages.

Badu-Tawiah, Abraham et al., "Ambient lon Soft Landing", Anal. Chem. 2011, 83, 2648-2654, published Mar. 16, 2011.

* cited by examiner 150 kDa M++;
Funnel voltage = 0
Vx = 0.5 m/s 150 kDa M++;
800, 1600, 2400, 3200, 4000
Vx = 0.5 m/s 150 kDa M+++;
200, 400, 600, 800, 1000
Vx = 0.5 m/s 150 kDa M+;
Funnel voltage = 0
Vx = 0.5 m/s 150 kDa M+;
1300, 2600,3900, 5200, 6500
Vx = 0.5 m/s

APPARATUS AND METHODS FOR DEPOSITING IONS ONTO A SURFACE

CROSS-REFERENCE TO RELATED APPLICATIONS

This application claims priority to, and is a 35 U.S.C. § 111(a) continuation of, PCT international application number PCT/US2022/081328 filed on Dec. 10, 2022, incorporated herein by reference in its entirety, which claims priority to, and the benefit of, U.S. provisional patent application Ser. No. 63/288,478 filed on Dec. 10, 2021, incorporated herein by reference in its entirety, and U.S. provisional patent application Ser. No. 63/291,441 filed on Dec. 19, 2021, incorporated herein by reference in its entirety. Priority is claimed to each of the foregoing applications.

The above-referenced PCT international application was published as PCT International Publication No. WO 2023/108163 A1 on Jun. 15, 2023, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

A. Technical Field

The technology of this disclosure pertains generally to preparing samples of molecules and particles on surfaces, and more particularly to preparing samples for examination by cryo-EM.

B. References

The following publications are incorporated herein by reference in their entireties.

1. Badu-Tawiah, A K, C Wu, and R G Cooks, Anal. Chem., 2011, 83, 2648-2654.
2. Baker E S, B H Clowers. F Li, K Tang, A V Tolmachev, D C Prior, M E Belov and R D Smith, J. Am. Soc. Mass Spectrom., 2007, 18(7): 1176-1187.
3. Belov M E, B H Clowers, D C Prior, W F Danielson III, A V Liyu, B O Petritis and R D Smith, Anal. Chem., 2008, 80(15): 5873-5883.
4. Benesch J L P, B T Ruotolo, D A Simmons, N P Barrera, N Morgner, L Wang, H R Saibil and Robinson C V, 2010, J Struct Biol 172:161-168.

5. Blake T A, Z Ouyang, J M Wiseman, Z Taka'ts, A J Guymon, S Kothari and Cooks R G, 2004, Anal Chem 76:6293-6305.
6. Chaudhary A, F H van Amerom and R T Short, Rev. Sci. Instrum., 2014, 85(10): 105101.
7. Clowers B H, Y M Ibrahim, D C Prior, W F Danielson III, M E Belov and R D Smith, Anal. Chem., 2008, 80(3): 612-623.
8. Cooks, R G, D. Snyder, A S Basu and W-P Peng, 2021, USPTO 11,037,777.
9. Deng Z T, N Thontasen, N Malinowski, G Rinke, L Harnau, S Rauschenbach and K Kern, 2012, Nano Lett 12:2452-2458.
10. Earl, et al Current Opinion in Structural Biology 2017, 46:71-78.
11. Fernandez de la Mora, J., S Ude and B A Thompson, Biotechnol. J., 2006, 1. 988-997.
12. Gologan B, J M Wiseman and R G Cooks, 2006 in Laskin J and C Lifshitz C, Eds., Principles of mass spectrometry applied to biomolecules, John Wiley& Sons., Inc., Hoboken, N J.
13. Hogan, Jr., C J, E M Kettleson, B Ramaswami, D R Chen, and P Biswas, Anal. Che., 2006, 78, 844-852.
14. Johnson, G E, D Gunarantne and J Laskin, Mass Spectrometry Reviews, 2016, 35, 439-479.
15. Julian R R, S R Mabbett, Jarrold M F, J. Am. Soc. Mass Spectrom., 2005, 16(10): 1708-1712.
16. Kaufman, S L, J W Skogen, F D Dorman, F Zarrin and K C Lewis, Anal. Chem. 1996, 68, 1895-1904.
17. Kim T, A V Tolmachev, R Harkewicz, D C Prior, G Anderson, H R Udseth and R D Smith, Anal. Chem., 2000, 72(10): 2247-2255.
18. Mikhailov V A, T H Mize, J L P Benesch and Robinson C V, 2014, Anal Chem 86:8321-8328.
19. Ouyang Z, Z Takats, T A Blake, B Gologan, A J Guymon, J M Wiseman, J C Oliver, V J Davisson and R G Cooks, 2003, Science 301:1351-1354.
20. Page J S, A V Tolmachev, K Tang and R D Smith, J. Am. Soc. Mass Spectrom., 2006, 17(4) 586-592.
22. Rinke, G., S Rauschenbach, L Harnau, A Albarghash, M Peuly and K Kern, Nano Letters DOI 10.1021/nl502122j.
22. Tang K, A A Shvartsburg, H N Lee, D C Prior, M A Buschbach, F Li, A V Tolmachev, G A Anderson and R D Smith, Anal. Chem., 2005, 77(10): 3330-3339.
23. Tata, A., C Salvitti and F Pepi, Int. J. Mass Spectrom., 2020, 450, 116309.
24. Wang P and J Laskin, 2008, Angew Chem Int Ed 47:6678-6680.
25. Volny M, W T Elam, B D Ratner and F Turecek, 2005, Anal Chem 77:4846-4853.
26. Walton, B L, W D Hoffmann and G F Verbeck, Int. J. Mass Spectrom., 2014, 370, 66-74.
27. Wyttenbach T, P R Kemper and M T Bowers, Int. J. Mass Spectrom., 2001, 212(1-3): 13-23.

C. Background Discussion

Cryogenic electron microscopy (cryo-EM) in recent years has become a more acceptable method to investigate the structure of single molecules, particularly proteins. To a great extent, the increased acceptance stems from hardware and software improvements. The resolution of cryo-EM is beginning to rival x-ray crystallography without the necessity for producing protein crystals, as is required for x-ray crystallography. Improvements in the methods to prepare samples for examination by cryo-EM have lagged behind the development of cryoelectron microscopes and have remained largely unchanged from the methods first developed in the 1980's. The typical method for preparing samples for cryo-EM investigation follows a few manual steps. First a protein is purified and transferred to an appropriate aqueous buffer. Next, a small volume of sample-containing buffer is pipetted onto a cryo-EM grid and afterwards most of the liquid is removed by absorbing the liquid into a piece of blotting paper, leaving protein molecules stuck to the grid surface and covered with a thin film of water. Finally, the wetted grid is plunged rapidly into a cryogen in order to freeze the water film fast enough so glassy ice forms rather than crystalline ice. The glassy ice secures molecules of interest for examination by cryo-EM. The plunging step is the trickiest to perform and when it is not performed correctly it becomes the most frequent cause for sample preparation failures. Improvements are needed to prepare samples more efficiently and more reproducibly (Earl).

BRIEF SUMMARY

The apparatuses and methods described in this disclosure provide a new way to deposit ions and charged particles onto surfaces for subsequent analysis. The technology described in this disclosure provides a means to deposit ions and charged particles onto surfaces in a manner that is called soft landing.

Soft landing refers to a condition that allows ions to land onto a surface softly enough so that the molecular conformation of the ion or charged particle is not altered during the landing process, nor does the landing process destroy weakly-associated molecular complexes or aggregated particles. The concept of soft landing implies that the kinetic energy of the ion or particle at the instant of impact is an inadequate amount of energy to damage the molecule or particle.

A significant difference between the technology described in this disclosure and previous approaches for depositing ions and particles softly onto surfaces relates to techniques performed at atmospheric pressure. This new technology provides a means to land ions onto fragile thin films, such as thin carbon films or films of graphene, that are easily damaged by high velocity impacts by ions or charged particles. The soft-landing approach provides an alternative to the general approach of suspending analyte molecules in frozen glassy water ice as is commonly done to prepare cryo-EM samples.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

A. Introduction

Figure 1:
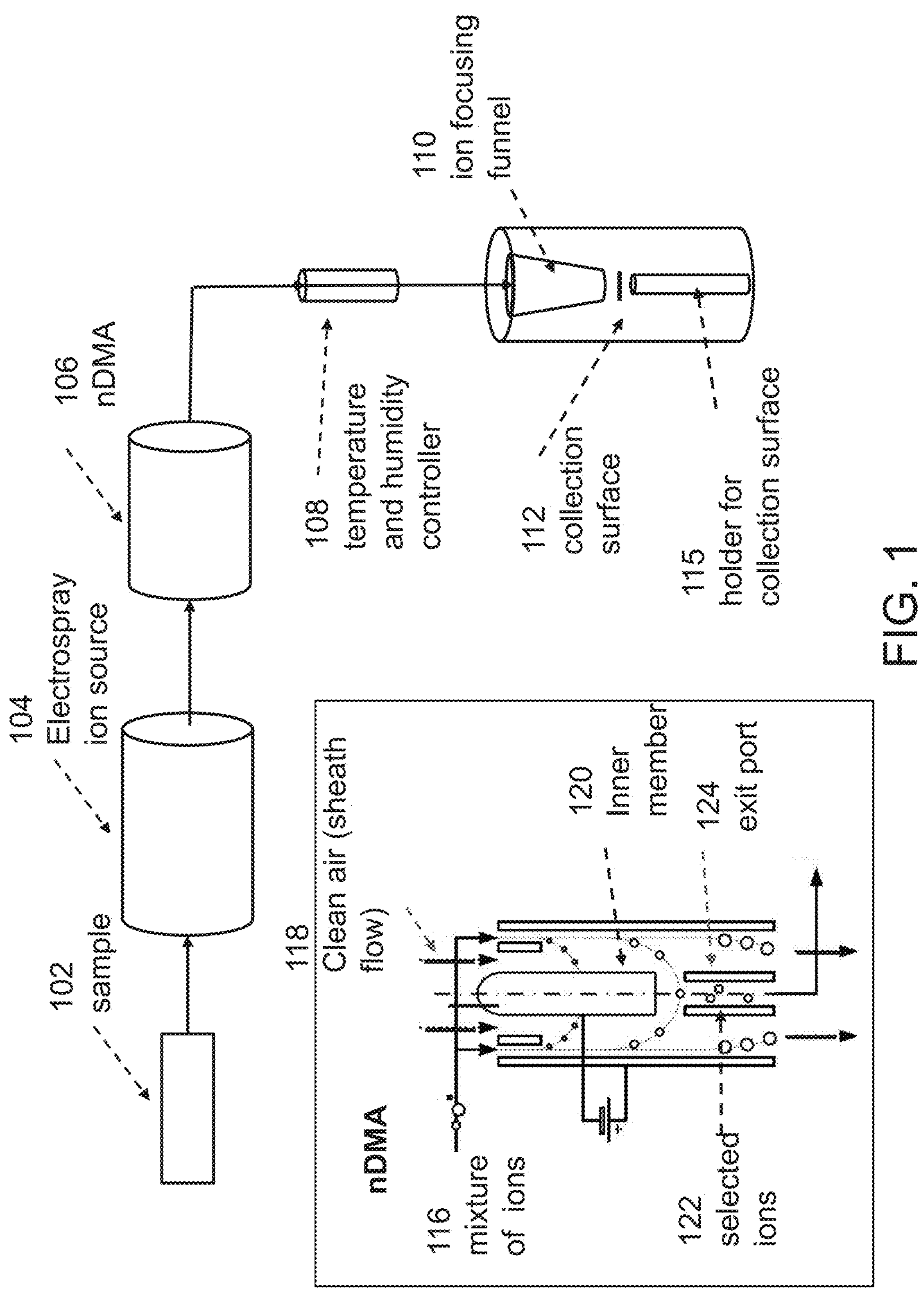
FIG. 1: An illustration of the primary components comprising a device to deposit mobility-selected ions or charged particles onto a collection surface. The insert illustrates in greater detail the operation of a nDMA.

This disclosure describes apparatuses and methods for depositing ions and particles onto surfaces using the following steps, all of which occur at atmospheric pressure: 1) a solution of analyte substances s, such as a mixture of protein molecules or nanoparticles, are converted to gas-phase ions or charged particles by means of an electrospray. 2) ions and particles having a predetermined electrical mobility are selected from a mixture of ions and particles by means of a differential mobility analyzer (DMA). 3) mobility-selected ions and particles are exposed to a humidity-controlled gas in order to control hydration. 4) ions and charged particles are guided to pass through an ion focusing chamber where they are concentrated along the center line of the chamber and further guided to land onto a substrate at a low impact velocity. 5) altering the conformation of ions and the shape of particles by exposure to water vapor, heat or cooling and, 6) preserving the conformation of ions and the shape of particles by means of refrigeration.

The technology described in this disclosure provides improvements over previous designs. A major improvement is achieved by operating the disclosed apparatuses at atmospheric pressure, as compared to the production of ion beams generated in vacuum, precludes the need for a vacuum chamber and de-accelerating lenses to control ion energy at the time an ion strikes a collector. Selecting ions or particles of a particular electrical mobility from a mixture of ions or particles by means of a DMA provides a means to analyze ions and charged-nanoparticles having a particular conformation or shape. In previous reports, ions or particles were selected according to their molecular mass using mass spectrometry-based systems rather than a DMA. One application of the disclosed technology is the preparation of samples for subsequent examination by cryoelectron microscopy. A requirement for cryo-EM is to collect and analyze images of protein molecules that have the same conformation but are oriented randomly on a cryo-EM grid surface. Therefore, a capability to select and deposit a large number of molecules having nearly identical conformations onto a collection surface, such as a cryo-EM grid, will improve the quality of cryo-EM images and reduce the number of molecular images that need to be processed to reveal a high quality molecular structure. The use of ion focusing in the present device provides a means to deposit a majority of the mobility-selected ions onto a cryo-EM grid, thus minimizing the time needed to deposit a requisite number of molecules onto a cryo-EM grid. A low-energy deposition process provides a means to land undistorted proteins onto cryo-EM grids, thus preventing impact damage. The combination of these advantages conceptualizes the soft-landing device described herein. When particles are directed to strike a surface, the particles may bounce away from the collection surface and are lost. Applying the disclosed soft-landing technology to the process of collecting particles enables better control of the deposition process. In this disclosure, the term 'ion' or 'ions' will also refer to and encompass the concept of 'particle', 'particles', 'nanoparticle and 'nanoparticles'.

An ion lands softly when it hits a surface at a low velocity. Surface induced dissociation is the opposite approach to the current technique and is the process of guiding an ion to hit a surface at a high velocity such that the kinetic energy of the ion is adequate to fragment the ion when it collides with a surface. A review of soft-landing methodologies and applications by Johnson describes previous attempts to deposit ions at low energy, generally at kinetic energy <200 eV. A series of reported developments reveals the investigation of lower kinetic energy impacts. The deposition of proteins using soft-landing approaches based on the vacuum environment of mass spectrometers was reported by Gologan et al. and Wang and Laskin. Multiply-charged electrosprayed protein ions which were deposited and then recovered intact, showed retained biological activity (Volnay 2005, Ouyang et al., 2003, Blake et al., 2004). Deng reported that the charge state of deposited protein ions influenced the structure of the deposited ion. They observed compact structures of Cytochrome C when low charge states were deposited and observed spaghetti-like strings when more highly-charged ions of Cytochrome C were deposited. Benesch et al. extended soft landing to large macroions of GroEL and reported that, in general, the shape of the GroEL complex survived the impact. However, Michailov, et al., point out that depositing proteins onto a surface in the vacuum of a mass spectrometer is a challenge and requires hypothermal impact velocity <100 eV (Rinke, et al.). Walton et al. described the deposition of ions in the sub-eV energy regime. Only a few publications report ion depositions conducted at atmospheric pressure and when such depositions are described they do not include the condition of ion focusing (Tata; Badu-Tawiah, et al.). The technology described in the present disclosure guides ions carried by a gas having controlled conditions of humidity and temperature to hit a collection surface at much lower energy than previously reported so that a protein's tertiary and quaternary structure is not damaged during deposition. The technology described in this disclosure provides a means to deposit ions onto a cryo-EM grid at deposition velocities corresponding to ion energies less than several meV.

B. Example Embodiments

1. Producing Gas-Phase Molecular Ions

One mode for operating the apparatuses described in this disclosure begins with selecting a protein for analysis by cryo-EM. An antibody molecule is an exemplary material that will be processed by the disclosed apparatuses. The charge-reduced form of electrospray ionization used in the technology described in this disclosure capably converts electrosprayed antibodies into singly-charged gas-phase antibody ions. The charge-reduced electrospray process presents different requirements for sample preparation than what is typically performed by an operator skilled in the art of electrospray mass spectrometry. The charge reduction process reduces the charge carried by electrospray droplets to a low level. The low level of charge precludes droplet fissioning, i.e., the electrostatic splitting of the droplets into progressively smaller droplets and the eventual formation of a nearly anhydrous protein ion. When there are nonvolatile buffer salts in an electrospray droplet, the nonvolatile salts will form a thin coating on the surface of the analyte molecule, causing the analyte ion to be larger in size than expected. A coating of salt is minimized in the present invention by efficiently removing nonvolatile salts from the sample using molecular weight spin filters and exchanging the sample into a volatile buffer, such as an ammonium acetate solution. Spin filtration using a molecular weight cut-off spin filter, such as passing a sample through an Amicon spin filter (PN UFC510096) several times, adequately reduces the salt content in the sample to an acceptable level, such as reduction of the salt content to a sub-micromolar concentration. Spin filtering along with the use of a volatile buffer, such as aqueous 25-200 mM ammonium acetate solution, provides a means to produce uncontaminated nearly-anhydrous singly-charged gas-phase ions.

Preparing samples for charge-reduced electrospray additionally necessitates the use of low analyte concentrations such as 1-50 ug/mL. Just as the presence of non-volatile salts will contaminate ions with a salt shell, the presence of more than one analyte molecule in a droplet will cause analyte molecules to coalesce as the droplet evaporates, leading to the formation of clusters, such as dimers and trimers, etc. of analyte molecules. Dimers, trimers and any multimers created by the use of relatively high analyte concentrations are called artificial aggregates. They are called artificial because they do not exist in a sample solution before the sample solution is electrosprayed. The detection of artificial multimers is problematic because their presence could lead to the faulty conclusion that antibody molecules were already aggregated in solution before the droplets evaporated. For this reason, it is necessary to analyze a relatively low concentration of an antibody in order to prevent the formation of artificial dimers, etc.

The size of primary electrospray droplets also influences the formation of artificial dimers because, as droplet size increases, the probability increases for more than a single antibody molecule to be trapped in a droplet. Electrospray droplet size is related to the viscosity, conductivity, surface tension and sample delivery rate. Viscosity and surface tension of dilute ammonium acetate solutions can be modified by the addition of organic liquids to the sample, such as isopropyl alcohol or acetonitrile. The addition of organic solvents is not desirable because the organic solvents may distort the conformation of the exemplary antibody. Sample conductivity increases with the concentration of ammonium acetate. A 200 mM aqueous ammonium acetate solution produces smaller droplets than 25 mM aqueous ammonium acetate when electrosprayed and therefore higher ammonium acetate concentrations allow higher antibody concentrations to be analyzed without the formation of artificial dimers, etc. Lower sample flow rates also produce smaller droplets than higher flow rates but electrosprays are not stable at either very low or very high flowrates thus necessitating the need to tune all the conditions in order to produce a stable electrospray. Electrospraying 100 mM ammonium acetate solutions at 300 nL/min produces droplets having an average diameter of 250 nm and allows analyte concentrations as high as approximately 1 micromolar to be analyzed with minimal formation of artificial aggregates.

A diagrammatic overview of the apparatuses described in this disclosure is presented in FIG. 1. A sample solution 102, such as an antibody dissolved in a dilute solution of ammonium acetate is electrosprayed using an electrospray ion source 104. The preferred electrospray ion source is a charge reducing source that generates singly-charged ions. The ions are conducted to a nano-differential mobility analyzer (nDMA) 106. The nDMA, illustrated in more detail in the inserted drawing **106*a* labeled nDMA, provides a means to conduct ions of a specific mobility to pass through a humidifier after which the ions are introduced into an ion focusing device. It should be understood that many different types of humidifiers and ion-focusing devices have been previously described. Herein we refer frequently to humidifier for use in controlling the water vapor content and temperature of an ion- or particle-laden gas stream. An example of an alternative embodiment for a humidifying a gas stream is a bubbler. An example of an alternative embodiment of a means to control the temperature of a gas stream is a chilled tube of a heated tube. an ion focusing funnel but any type of ion focusing device might be used as a substitute for a funnel-shaped device. As described in this disclosure, an ion focusing funnel concentrates ions towards the centerline of the focusing funnel, as they pass through the funnel, for the purpose of guiding ions efficiently towards a collection surface, such as a cryo-EM grid, positioned at the exit end of the focusing funnel. Collection surfaces other than a cryo-EM grid might be used and will benefit from the use of ion focusing. Our frequent reference to cryo-EM or cryo-EM grid are used to denote an exemplary application or an exemplary subsequent analytical method for analyzing a sample. An example of an alternative embodiment for providing ion focusing is an electrically resistive cylinder or tube, such as resistive glass from Photonis Inc. or a cylinder or tube fabricated with an anti-static plastic such as polyurethane Illustrations in this disclosure use arrows with solid lines to indicate the flow of a fluid and the direction of the flow. Arrows with dashed lines serve to identify a component in the illustrations. Referring again to FIG. 1, a liquid sample is conducted to an electrospray ion source by means of a capillary tube such as a 50 μm id×220 μm od fused silica capillary (Trajan Scientific, PN 062444). Charge reduced electrospray ions produced in the electrospray ion source are conducted to a nDMA. Mobility-selected ions or charged particles are further conducted through a temperature and humidity controlling device 108 and even further into an ion or particle focusing funnel 110 where they are deposited onto a collection surface 112 supported by a holder 114. The inset 106***a* in FIG. 1 illustrates the operation of a nDMA. A mixture of ions or charged particles 116 is conducted into an annular space along the inside of an outer wall of the nDMA. The ions or charged particles merge with a flow of clean sheath gas 118 and afterwards are exposed to an electric field provided by voltage supplied to a cylindrical inner member 120. The insert shows the result of a fixed voltage applied to the inner member. Ions of a specific mobility 122 are guided to pass through an exit tube 124.

Figure 2:
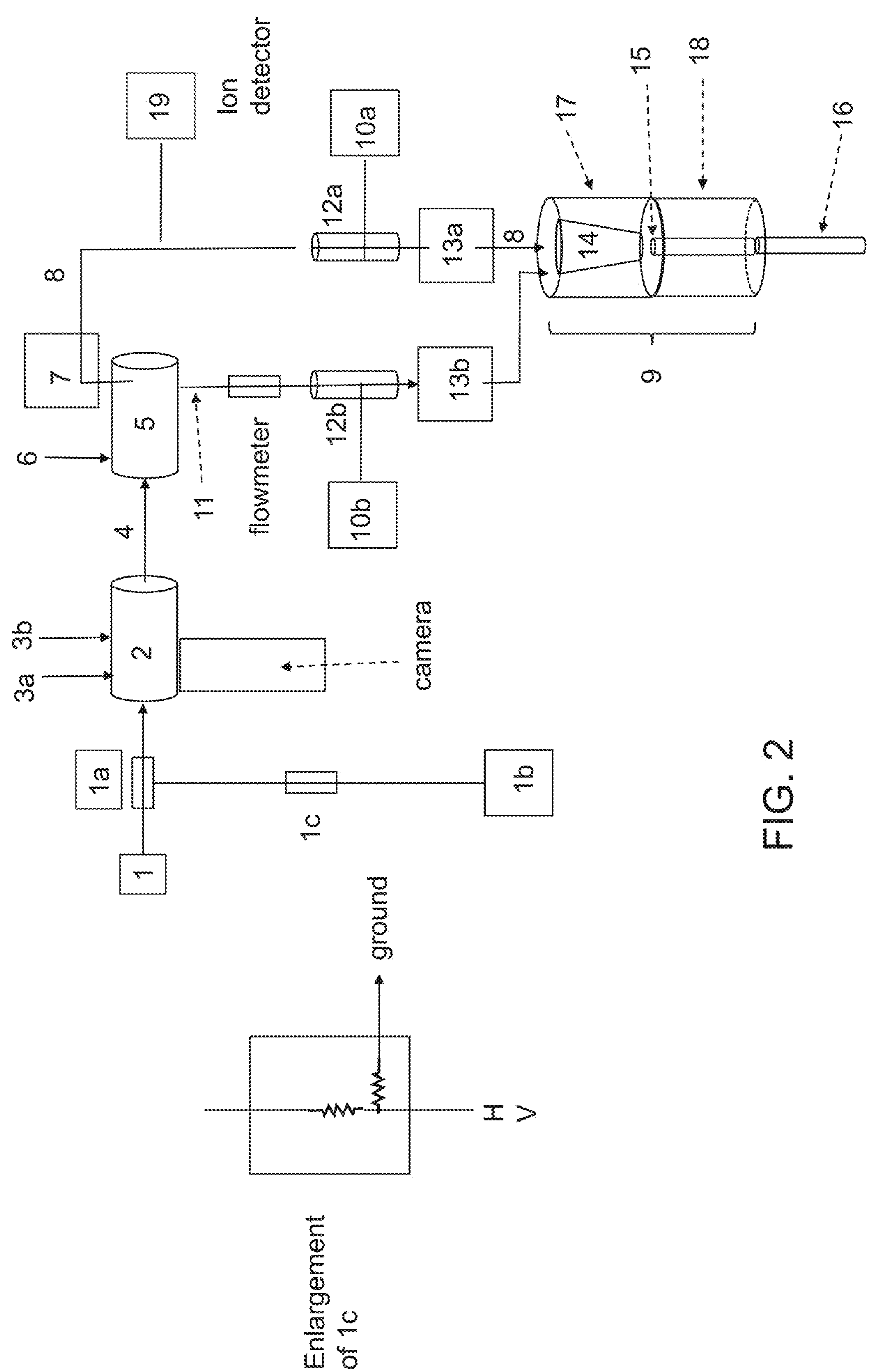
FIG. 2: A detailed illustration of the components used to deposit mobility-selected ions or charged particles onto a collection surface.

FIG. 2 illustrates with detail one embodiment of the technology described in this disclosure. Capillary tube 1 delivers a liquid sample to electrospray ion source 2. The liquid sample contains analyte molecules. An exemplary sample is an antibody dissolved in 100 nm ammonium acetate. A preferred capillary is a polyimide coated fused silica capillary 220 μm od×50 μm id and length less than 30 cm, such as PN 062462 from Trajan Scientific, Australia. Capillary tube 1 is provided with a pressurized source of sample at its inlet, such as a syringe pump or an autosampler connected to a microfluidics pump that apples pressure to the sample causing it travel through capillary tube 1. Capillary tube 1 is also provided with electrical connection 1*a* that connects voltage from power supply 1*b* to the liquid sample flowing through 1*a* for the purpose of generating an electrospray. In a preferred embodiment, the electrical connection is a stainless-steel microfluidics union (e.g., IDEX Healthcare). At times it is necessary to replace the electrospray capillary 1 with a new capillary after the capillary becomes clogged. Since the high voltage connection 1*a* is provided with high voltage, such as 2 kV, it is a safety requirement to remove the high voltage while replacing the capillary. In the event the high voltage is not removed from 1*a* while the capillary is being replaced, a current limiting resistor and bleed down resistor are installed in the high voltage line leading from the high voltage source 1*b* to the high voltage connection 1*a*. The combination 1*c* of a current limiting resistor and bleed down resistor are illustrated in an enlarged drawing of 1*c* in FIG. 2. Each electrical resistor in 1*c* is a 5 kV 1 M-ohm resistor. 1*c* reduces, but does not eliminate, a potential exposure to high voltage if 1*a* were to be touched by an operator while high voltage is provided to 1*a*.

Those skilled in the practice of producing electrosprays will know that a tip on the exit end of capillary 1 enables the formation of a stable electrospray. The tip on capillary 1 is held in a centered position inside electrospray ion source 2. Electrospray ion source 2 contains a small sealed source of radioactive Polonium 210, such as a model P-2042 nucleospot from NRD, LLC, Grand Island, NY. Alpha particles released by decaying Polonium 210 atoms generate a cloud of bipolar air ions in the vicinity of the electrospray droplets. Bipolar air ions produced by Polonium 210 alpha particles interact with the charges carried by the electrospray droplets, causing the charges on the droplets to be reduced to a low level, such that a known fraction of the droplets carry a single charge predicted by the Boltzmann charge distribution. The importance of producing singly-charged ions will be described later. The design of electrospray ion source 2 follows previous ion sources designed to reduce the charge on electrospray droplets and ions, such as the designs described by Kaufman et al., Fernandez, et al., and Hogan, et al. The technology described in this disclosure provides improvements over the works of Kaufman et al., Fernandez, et al., and Hogan, et al. In a preferred embodiment of the technology described in this disclosure, mass flow controller 3*a* provided with a pressurized source of dry air provides 1.5 Lpm of dry air to ion source 2. A second mass flow controller 3*b* provided with a supply of pressurized $CO_2$ provides 0.2 Lpm of $CO_2$ to ion source 2. Introducing the combined flows of air and $CO_2$ into electrospray ion source 2 provides a means to carry electrospray droplets released from the tip of capillary 1 through the body of electrospray ion source 2. where they interact with gas and air ions as they travel through electrospray ion source 2. The use of mass flow controllers achieves better control of gases provided to the electrospray ion source 2 described previously by Kaufman et al., Fernandez, et al., and Hogan, et al. The mass flow controllers provide a more stable control of these gas flowrates than rotameters described previously, particularly when the supply of compressed air is provided by an air compressor because the pressure delivered by a compressor is not constant over time, but rises and falls during on and off cycles of the compressor pump.

Continuing with FIG. 2, a video camera, such as Dino-Lite model AD4113TL, www.dinolite.com, is attached to ion source 2 and focused on the on the tip of the end of electrospray capillary tube 1 as a means to inspect the Taylor cone during the time a sample is electrosprayed. Those skilled in the art of electrospray ion formation will understand the utility of a capability to examine the stability of the Taylor cone. A Taylor cone describes a pointed shape of liquid emanating from the tip of an electrospray capillary. A live-in-time video image of the Taylor cone enables the operator to inspect the Taylor cone and adjust the voltage provided to the sample as a means to produce a stable Taylor cone, i.e., a Taylor cone that does not flicker for the purpose of generating stable ion currents. The implementation of a video camera in the technology described in this disclosure is an improvement over the apparatuses described by Kaufman et al., Fernandez, et al., and Hogan, et al. because the image of the Taylor cone can be inspected at high magnification with the video camera. In a preferred embodiment of the technology described in this disclosure, a Dinolite (www.microscopes.com) model AD4113TL camera is used to visualize the Taylor cone in electrospray ion source 2.

2. Selecting Ions Having a Specific Electrical Mobility

Electrospray droplets generated in ion source 2 evaporate as they travel through the electrospray ion source 2. The charge carried by each droplet is transferred to an analyte molecule carried by an electrospray droplet as the droplets evaporate. Evaporation leads to the formation of gas-phase analyte ions. The gas-phase analyte ions are conducted out of electrospray ion source 2, by means of an exit tube 4. Exit tube 4 conducts ions to nano-DMA 5 wherein analyte ions are separated according to their electrical mobility, as illustrated in the inserted drawing in FIG. 1

In a preferred embodiment, nDMA 5 is a nano-DMA (TSI, Inc., model 3085). nDMA 5 is operated with a sheath flow of air provided by a 25 psig source of dry air and a mass flow controller 6 (e.g., Sierra Instruments, Monterey, California) set to provide 20 Lpm of air to a port labeled "sheath flow" on nDMA 5. The nDMA can be operated optionally with sheath flows other than 20 Lpm, such as sheath flows in the range of 5-40 Lpm in order to select a range of ion or charged particle sizes from which specific-sized ions or charged particles can be conducted through the nDMA. A sheath flow of 5 Lpm provides a range of selectable particle and ion sizes that is smaller than the range of particles and ion conducted through the nDMA while the nDMA is operated with a sheath flow of 40 Lpm.

Those skilled in the practice of differential mobility analyzers will understand the concept of operating a differential mobility analyzer as a filter for ions and charged particles. In the technology described in this disclosure, model 3085 provides a means to select ions having a narrow range of size from a population of ions having a much larger range of size. Operating conditions for the model 3085 provides a means to select a subset of ions that fall between approx. 2 nm in diameter and 200 nm in diameter. The term 'selecting a sub-set of ions" refers to conditions of sheath gas flow and a voltage applied to an inner member of nDMA 5. For example, when a sheath flow of 20 Lpm is used and 180 volts is applied to the inner member of the nDMA, singly-charged ions near in diameter to 7 nm are transmitted through the nDMA. The use of 20 Lpm sheath gas flow and the application of 180 volts to the inner member of the nDMA are operating conditions that will allow singly-charged albumin ions to pass through the nDMA. The term "mobility-selected ions" is an expression that describes ions that have been directed to pass through the nDMA for the purpose of selecting a sub-set of ions.

The exact range of particle or ion sizes that can be selected by nDMA 5 are provided by the manufacturer of nDMA 5. In addition to the sheath flow, a flow of ion-laden gas is provided to nDMA 5. The electrospray ion source 2, provides a flow of ion-laden gas that is conducted from electrospray source 2 to nDMA 5 by means of tube 4. A flow of gas carries mobility selected ions out of nDMA 5.

Mobility-selected ions are produced by nDMA 5 in the present device using two different techniques. In a first technique, the voltage applied to the inner member of nDMA 5 is a ramped voltage. An example of a ramped voltage is a voltage that begins with 0 volts applied to the inner member of nDMA 5 and rises to 10 kV over a period of several minutes. During the time of the ramp, ions having increasingly lower mobility are conducted through nDMA 5 as the voltage applied to the inner member of nDMA 5 is increased. A ramped voltage is used to generate mobility spectra, as illustrated in FIG. 24 to FIG. 28. A ramped voltage is also useful for determining the voltage that is needed to conduct ions having a specific mobility to a collection surface, such as a cryo-EM grid. By noting the position of a peak in a mobility spectrum with respect to ramp time or ramp voltage, it is possible to deduce the voltage that was applied to the inner member of nDMA 5 during the time the peak was recorded. In a second technique, the voltage applied to the inner member of nDMA 5 is a fixed voltage. A fixed voltage is useful for conducting ions having a specific mobility to a collection surface for an extended period of time. Fixed and ramped voltages are provided to nDMA 5 by customized software that drives a National Instruments USB-611 module. The 611 module is connected to a high voltage power supply, such as a Bertan model 255, via an analog signal. The output from the model 255 is connected to the inner member of nDMA 5.

It is preferable to balance the flowrate of the inflowing sheath flow provided to nDMA 5 and the outgoing sheath flow exiting from nDMA 5. Balancing the flows is accomplished by means of valve 7. Valve 7 provides a flow restriction to the flow of gas that carries mobility-selected ions out of nDMA 5. In a preferred embodiment, the valve is a Swagelok model SS-1RS4-A valve. Adjusting valve 7 provides a means to balance the incoming and outgoing flow of sheath gas passing through nDMA 5 while nDMA 5 is operated with a mass flow controller to establish the sheath flow through nDMA 5. Adjustment of valve 7 is performed while observing the gas flow rate indicated by the flowmeter. After the flowrate indicated by flowmeter is equal to the flowrate established by mass flow controller 6, it can be understood that the flowrates are equally balanced. Mass flow controller 6 is readily adjusted by custom software available from IonDX, Monterey, California, in comparison to the recirculating flow provided by TSI, Inc. model 3080, which is not controllable by third party software.

The manufacturer of the nDMA provides a means to balance the incoming and outgoing sheath gas flow based on a closed-circuit recirculating blower (model 3080). The use of a recirculating blower introduces a specific volumetric flow of sheath gas into a nDMA and then withdraws an equal volumetric flow of gas from a nDMA. The recirculating flow of sheath gas provided by model 3080 is insufficient to provide sheath flows as large as 40 Lpm. The recirculating sheath flow provided by model 3080 recirculates room air through the nDMA. During the course of experiments conducted with a model 3080, and the use of a recirculating blower, water vapor builds up in the sheath flow due to partial mixing of the flow of gas provided by the electrospray ion source and the flow of sheath gas. The technology described in this disclosure establishes sheath flow conditions in which the incoming sheath flow is continually supplied by dry gas provided to mass flow controller 6. The benefit of the present design over the model 3080 is better control of the population of ions that are selected by nDMA 5. In the technology described in this disclosure, all selected ions pass through a sheath gas flow of known and controlled water vapor content. The present design therefore provides more precise control of the ions that will be directed to land on a collection surface because the water vapor content of the sheath gas influences the electrical mobility of ions. Also, ions passing through humid gas are slightly larger than ions passing through dry gas because ions passing through humid gas accrete a few water molecules. For considerations of selecting ions or particles with specific electrical mobility, as understood by those who practice ion mobility spectrometry, the technology described in this disclosure should be understood to provide more precise control over the ions that are conducted through nDMA 5. Later in this description, a provision of the technology described in this disclosure will be described in which the water vapor content of the sheath gas flow is an optionally adjustable parameter, which is a capability not provided by model 3080.

Figure 3:
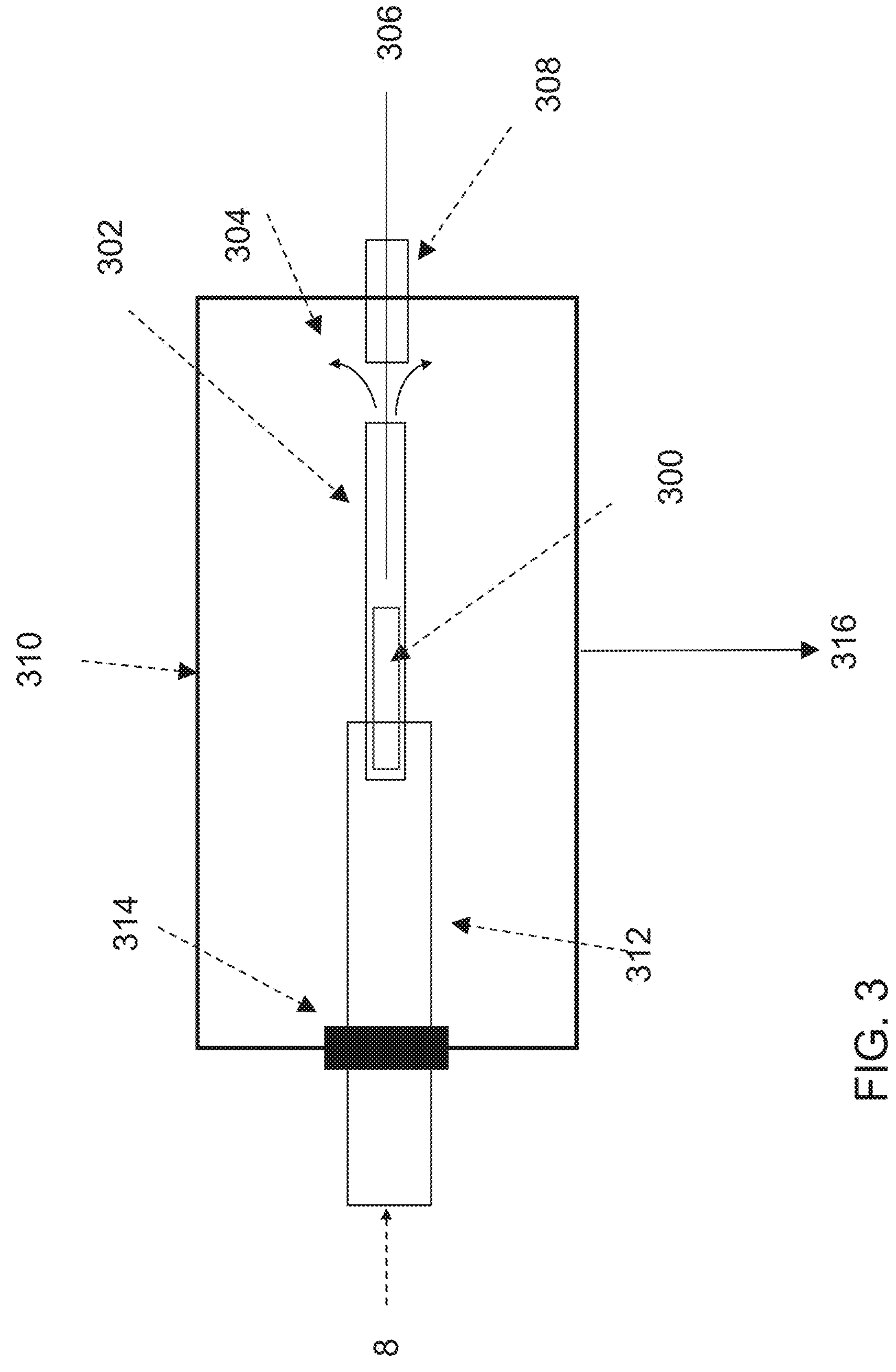
FIG. 3: Ion detector used for collecting ions and charged particles for the purpose of detecting and recording the electrical current of ion or charged particles.

In one embodiment of the technology described in this disclosure, mobility-selected analyte ions exit nano-DMA 5 through valve 7 and are conducted only to ion detector 19 via tube 8, as illustrated in FIG. 2. Ion detector 19 is described in further detail in FIG. 3. Ion detector 19 functions as a particle and ion filter. Ion-laden gas conducted through tube 8 is conducted through a 20 mm long plug of fine mesh steel wool 300 in a 50 mm length of 5 mm×4 mm id glass tube 302. After the flow of gas passes through the steel wool, the resulting particle-free and ion-free gas escapes from the distal end of glass tube 302, as illustrated by curved arrows 304, that represent gas flow streamlines. The steel wool is connected electrically to picoammeter 306, such as a Keithley model 6400, via BNC connector 308 secured in the wall of ion detector 310 or 19 as illustrated in FIG. 2. Charge carried by charged particles and ions after they are filtered by the steel wool is transferred to the steel wool and further detected as an electrical current by picoammeter 306. An entrance section of 10 mm length of the glass tube is sealed inside of a 5 mm id×60 mm length of brass tube 312. Brass tube 312 is secured in a hole in the wall of a 4.5"×3.5"×2" metal enclosure 310 by means of a plastic grommet 314. The metal enclosure is connected to an electrical ground 316 for the purpose of providing electrical shielding around the steel wool so that small electrical currents can be measured without interference from environmental electrical noise.

As described above, a ramped voltage or a fixed voltage can be applied to an inner member in nDMA 5. Ion detector 19 can be used to record an ion mobility spectrum while the voltage provided to the inner member of nDMA 5 is ramped. An ion current is detected by ion detector 19 while ions of a selected mobility are conducted to ion detector 19. Ion detector 19 can also be used to monitor the ion current while a fixed voltage is applied to the inner member of nDMA 5. Monitoring the ion current while a fixed voltage is applied to an inner member of nDMA 5, provides a reference signal of the magnitude of an ion current before the flow of ions is conducted farther through components of the technology described in this disclosure and is useful for determining the extent to which ions are lost during passage through the components. The fractions of ions lost during passage through components of the system is determined by calculating the ratio of the ion current exiting a component to the ion current measured at the exit to nDMA 5.

3. Exposing Mobility-Selected Ions to Controlled Humidity

Referring again to FIG. 2, in one embodiment of the technology described in this disclosure, mobility-selected analyte ions exit nano-DMA 5 through valve 7 and are conducted to humidifier 12*a* by tube 8. The humidifier provides a means to control the temperature and water vapor content of the flow of ion-laden gas. Temperature control module 10*a* heats water inside the humidifier 12*a* and when set to a particular temperature produces a predetermined level of humidity in the ion-laden gas. The humidity-controlled ion-laden gas is conducted by 8 into dew point sensor 13*a*, such as Easydew Online monitor, model 0422, Mitchell Instruments Hauppauge, NY, and then into ion focusing chamber 9. A second humidifier 12*b* provides a means to control the dew point of the sheath gas that escapes from nDMA 5. Sheath gas escapes from the nano-DMA 5 through a side port 11. The sheath gas is conducted to humidifier 12*b*. Humidifier 12*b* operates identically as humidifier 12*a*. The humidity controller also controls the temperature of the gas flow. In a preferred embodiment of the humidifiers, the humidity-controlled sheath gas is conducted from 14 into dew point sensor 13*b* and then into ion focusing chamber 9 for use as a sheath flow in the ion focusing chamber 9. A preferred embodiment of the humidifiers is illustrated later in FIG. 4. It should also be understood that humidifier 12*a* and or humidifier 12*b* can be operated without power so as not to provide humidification. Furthermore, the humidifiers can be operated to reduce the temperature of the gas flows as a means to reduce the humidity of the gas flows. In another embodiment, the humidifiers can be operated in a manner to chill the gas flows and cause water vapor to condense onto ions or particles passing through the humidifiers. This mode of operation provides a means to deposit ion-laden droplets onto a collection surface. In another embodiment, the humidifiers can be operated in a manner that freezes the condensation droplets as they pass through the humidifiers. This mode of operation provides a means to deposit ions or particles in tiny ice balls onto surfaces.

The humidity-controlled flows of gas conducted out of dew point sensors 13*a* and 13*b* are introduced into ion focusing chamber 9 wherein the ions enter ion funnel 14 for the purpose of focusing the ions towards the centerline of funnel 14 for the purpose of focusing and guiding ions and or particles to land onto a collection surface, such as a cryo-EM grid. The design of focusing chamber 9 provides a means to focus ions in humidity-controlled gas. In the technology described in this disclosure, control of the humidity of the gas that conducts ions through the funnel is an important parameter. Humidity influences the extent to which an ion or particle is hydrated. Higher humidity creates ions with a higher level of hydration. The technology described in this disclosure provides a means to deposit ions having particular levels of hydration onto a landing surface, such as a cryo-EM grid. Particular levels of hydration are established by controlling the humidity the ion-laden gas. It is of particular importance to generate humidity levels that hydrate the ions while maintaining a humidity level that is low in order to prevent condensation of water vapor onto the collection surface during the time ions are deposited onto a cooled collection surface. In one use of the disclosed apparatuses it is desirable to prevent condensation onto the collection surface of a cryo-EM grid while the cryo-EM grid is attached to a cold finger. In other types of studies performed with the disclosed apparatuses, it is desired to study chemical reactions in humidified particles in order to produce reaction conditions found in outdoor environments, such as in fogs or clouds. Upper cylinder 17 and lower cylinder 18 comprise the body of the focusing chamber 9. Cylinder 17 and cylinder 18 can be separated to gain access the end 15 of rod 16 for the purpose of loading or removing a collection surface, such as a cryo-EM grid from the end 15 of rod 16.

Figure 4:
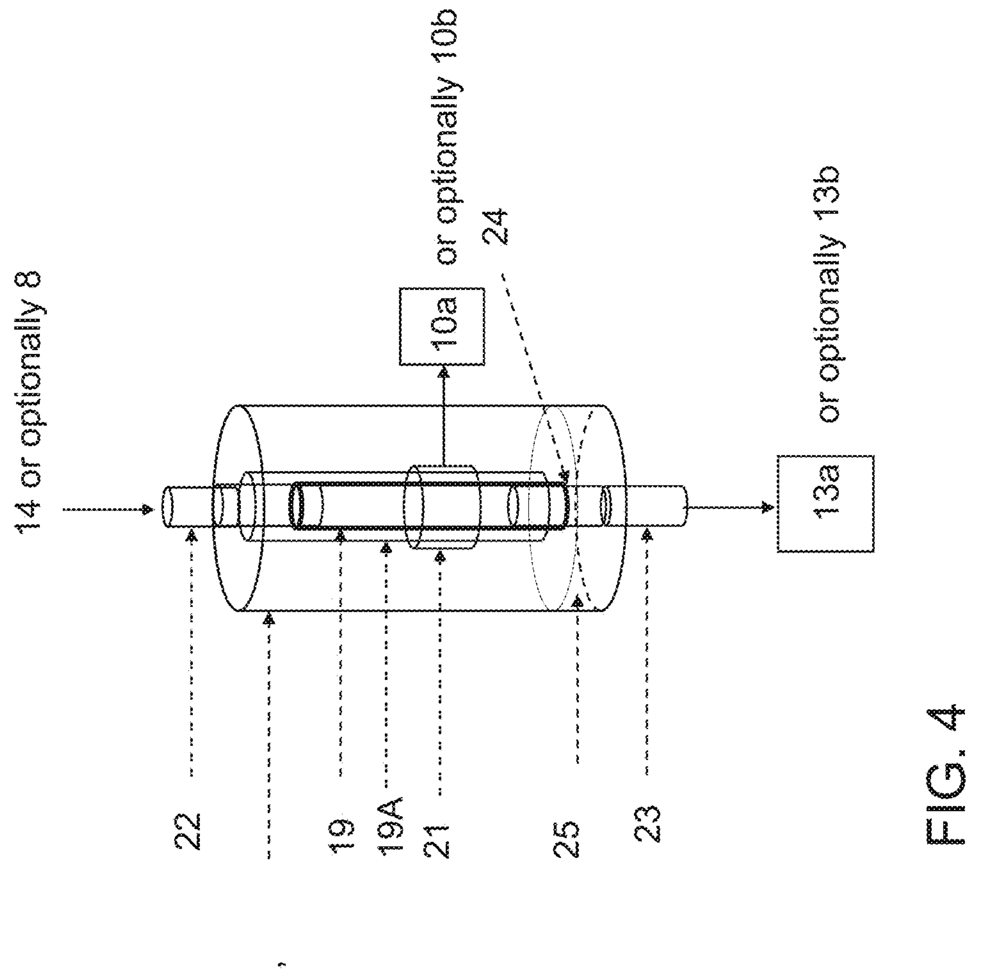
FIG. 4: Illustration describing a design for a humidifier.

A preferred embodiment of the humidifiers 12*a* and 12*b* while the humidifiers are operated in a manner to add water vapor to the flow of gasses is described in further detail in FIG. 4. Humidifiers 12*a* and 12*b* each contain a wetted tubular wick 19 that is housed in metal tube 19A. Tube 19A is surrounded by an electrical resistance tube heater 21 controlled by a temperature control module 10*a*. Air passing through the tubular wick 19 picks up water vapor evaporated from wick 19, thus humidifying the air stream. An example of tubular wick 19 is a ¼" diameter 3-layer thick roll of filter membrane, such as a DVPP from Millipore-Sigma. Tubular wick 19 is held in position by inlet 22 and exit 23 tubes. Exit end 23 of wick 19 is located in water 25. Capillary action draws water 25 into wick 19 for the purpose of maintaining a wetted wick. This design for the wick is similar to the wick described by Herring, Spielman and Lewis in U.S. Pat. No. 11,029,240 B2 the operation of a wetted wick provides conditions for generating ion-laden or particle-laden droplets.

4. Focusing Ions to Strike a Cryo-EM Grid

The actualization of ion focusing in ion focusing chamber 9 is based on prior art described in the literature. Baker, et al., Belov, et al., Chaudhary, et al., Clowers, et al., Ibrahim, et al., Julian, et al., Kelley, et al., Kim, et al., Page, et al., Tang, et al., and Wyttenbach, et al., have described the design and operation of ion funnels as means for improving the performance of electrospray mass spectrometers. An ion funnel described in prior art is generally used in the field of mass spectrometry to capture a plume of electrospray ions and guide them efficiently onto a collection surface inside the vacuum chamber of a mass spectrometer. Ion funnels have also been used in ion mobility mass spectrometers, but again for the purpose of enabling efficient transport of ions into vacuum chambers. The use of an ion funnel to focus and then deposit low velocity ions onto a target, such as a cryo-EM grid in this disclosure, is not an obvious extension of descriptions of the prior art of ion funnels. A commercially available device called a nanometer aerosol sampler Model 3089, TSI, Inc., has been developed for the purpose of depositing charged particles onto a collection surface maintained in atmospheric pressure gas, such as room air. It uses a voltage, opposite in polarity to the polarity of the charges carried by the particles of interest as a means to attract electrostatically charged particles onto a deposition surface. In this device a voltage <+/−10 kV is applied to a collection surface for the purpose of electrostatically attracting charged particles to land on a collection surface located inside of the nano-particle sampler. The use of the nano-aerosol sampler has not been described as a soft-landing device because of the high voltage applied to the collection surface mounted onto the collector rod inside of the nanometer aerosol sampler.

Figure 5:
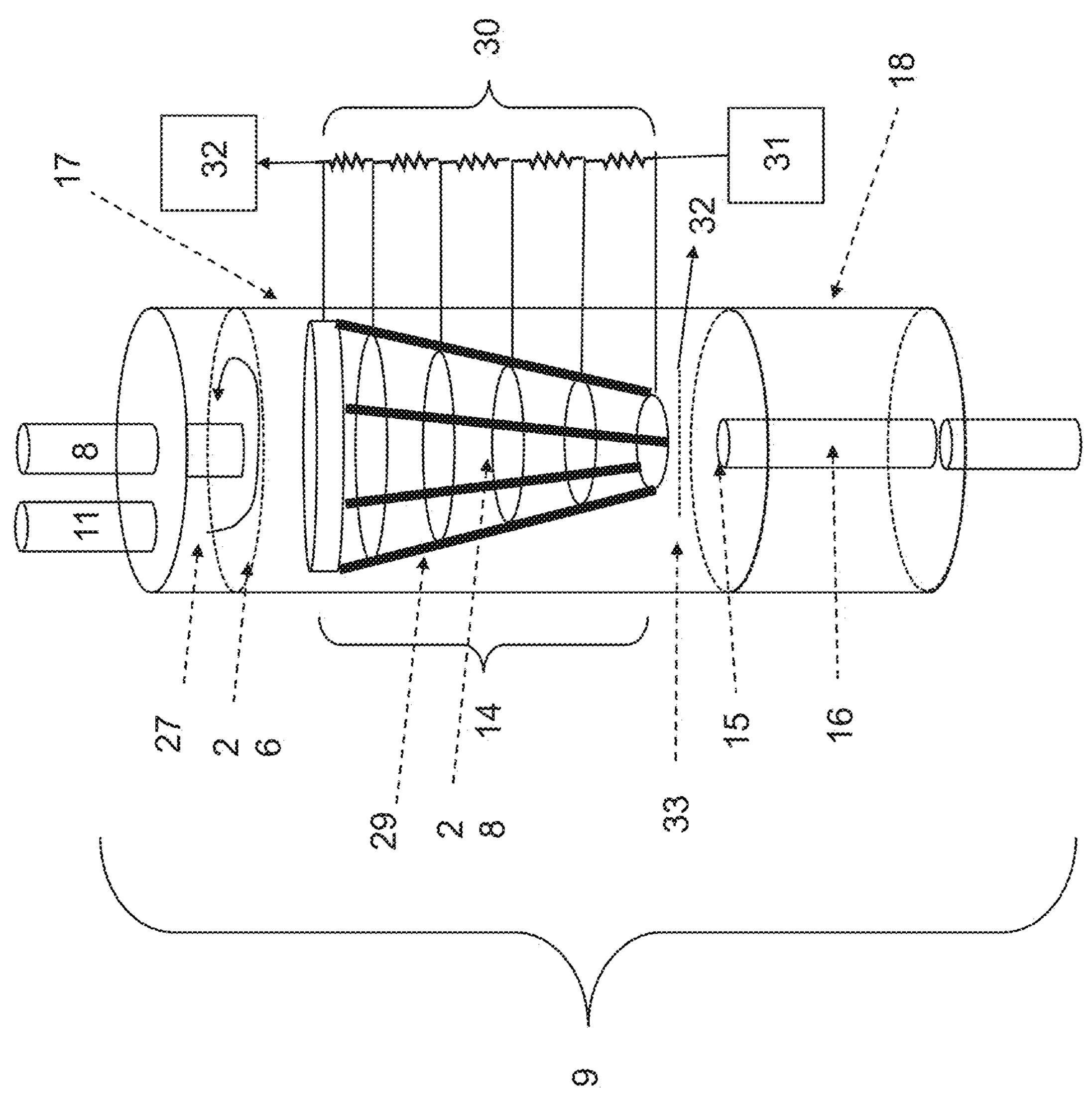
FIG. 5: Illustration describing a design for an ion focusing funnel.

Referring to FIG. 5, ion focusing funnel 14 imparts an electric field surrounding the flow of gas and analyte ions, causing the analyte ions to move towards the longitudinal centerline of the ion funnel where they become concentrated, i.e., focused, near to the centerline of the funnel. The focused ions are directed by gases flowing through the funnel to approach the end 15 of rod 16. Rod 16 is designed to fit into a sliding seal on the bottom of chamber 18. A sliding seal, such as an o-ring seal, allows the rod to be moved in and out of chamber 18. The flow of gases that directs the ions or particles to approach end 15 of rod 16 pushes the ions or particles close to end 15 of the rod 16, thus allowing diffusion to deposit a fraction of the ions onto the end 15 of rod 16. In one embodiment of the apparatuses described in this disclosure, a cryo-EM grid is mounted on the end 15 of rod 16 and diffusion acts to deposit ions onto the cryo-EM grid. In another embodiment of the technology described in this disclosure, the rod is a cold finger. Those skilled in the art of refrigeration will understand that the cold finger provides a means to cool the end of rod 16 and a collection surface attached to it as a means to preserve substances, such as proteins, that were deposited onto the collection surface. In another embodiment of the ion focusing chamber, rod 16 is connected to a voltage source and powered with a voltage that attracts ions to travel towards the rod, such as the application of a negative voltage to improve the efficiency for collecting positive ions. It should be understood that collection is not limited to positive ions and negative ions or particles can be collected after the polarity of the ions and collection surface is reversed.

Continuing to refer to FIG. 5, further details of the design and operation of ion focusing chamber 9 and ion focusing funnel 14 show a means to conduct ions through an extension of tube 8 into the entrance of ion focusing funnel 14. The humidity-controlled gas conducted through an extension of tube 11 passes through diffuser 26. Diffuser 26 provides a resistance to the flow of humidity-controlled gas, causing the humidity-controlled gas to expand across the entrance of diffuser 26, as depicted by gas dispersion 27. Diffuser 26 thus provides an even flow of gas across the diameter of tubular column 17. The resulting evenly dispersed flow of sheath gas surrounds the flow of ion-laden gas introduced by tube 8. It can be understood that the even flow that surrounds the ion-laden flow from tube 8 is a sheath flow in ion focusing funnel 14. The sheath flow continues to surround the flow of ion-laden gas as these gasses flow through ion focusing funnel 14. A preferred embodiment of the technology described in this disclosure introduce 2.0 Lpm of ion-laden gas and 20 Lpm of sheath gas into the ion focusing funnel 14.

Continuing to refer to FIG. 5, five circular wire rings comprise the electrostatic focusing elements of focusing funnel 14. The design is not limited to wire rings but could include electrodes fashioned using a stack of circular plates provided with centered holes. Ring 28 is an exemplary ring. Ions enter the funnel through the widest diameter ring and exit funnel 14 through the smallest diameter ring. FIG. 5. illustrates an exemplary funnel assembled with a band and five rings supported with four ribs. 29 is an exemplary ring-supporting post. The preferred embodiment of ion focusing funnel 14 is a stack of one circular band and five circular focusing rings. The band is 58 mm in diameter and the rings are circles of wire 50, 41, 32, 24 and 15 mm in diameter fabricated with stainless steel wires 1 mm thick (diameter). The five rings are supported by six ribs. The rib assembly was 3D printed using ABS plastic. The overall length of the ring assembly is 70 mm. Five electrical resistors 30 connected in series between a voltage source 31 and an electrical ground 32 comprise a voltage divider used to provide voltage to each of the rings. In a preferred embodiment of the technology described in this disclosure, an exemplary voltage of 1 kV is provided to the smallest ring and 0.8, 0.6, 0.4, 0.2 and 0 kV is provided respectively, to each of the increasingly larger diameter rings by means of electrical connections between the rings and the resistors in the voltage divider 30. The operation of focusing funnel 14 is not limited to 1 0.8, 0.6. 0.4, 0.2, and 0 volts but could also be powered with RF voltage.

Figure 6:
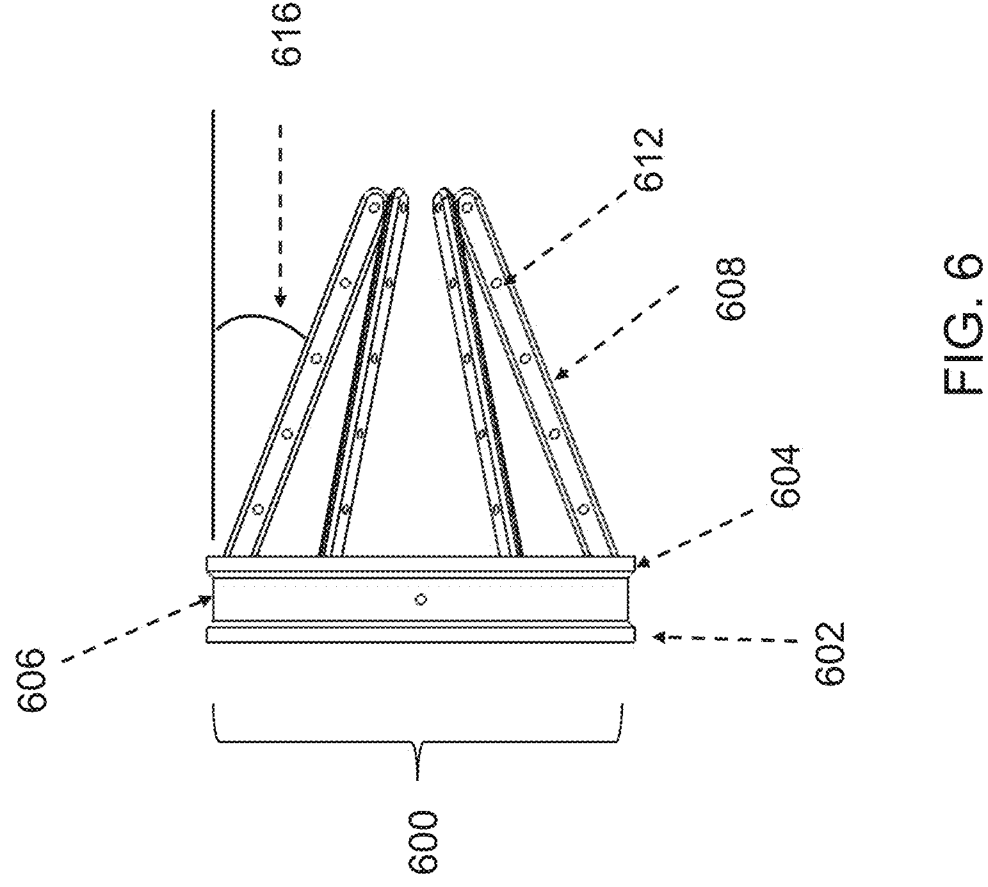
FIG. 6: Illustration of a circular base and tilted arms useful for securing circular wire rings comprising ion focusing electrodes.

Further illustration of ion focusing funnel 14 is presented in FIG. 6. A cylinder (600) having an entrance section 602, an exit section 604 and a middle section 606 comprise components of a 3-D printed part. A band of sheet metal (0.015" thick), such as stainless steel, is wrapped around the entire width and circumference of middle section 606 and the ends of the wrapped sheet metal are secured together to form a cylinder. This metal cylinder is called a band, vide supra. Six ribs 608 extend from the inner diameter of 600 towards the center of the longitudinal axis of 600. Ribs 608 are attached to the inner surface of the middle section 606 and angle towards the longitudinal center line of 600. The angle of the ribs with respect the longitudinal centerline of 600 illustrated by angle 610. The ribs have cross sections with the longer dimension of the cross section aligned with the radius of 806 in FIG. 8A. Five holes 1 mm diameter are equally spaced along the length of a rib. Holes 612 in the ribs provide support for I mm thick rings of copper wire.

Figure 7:
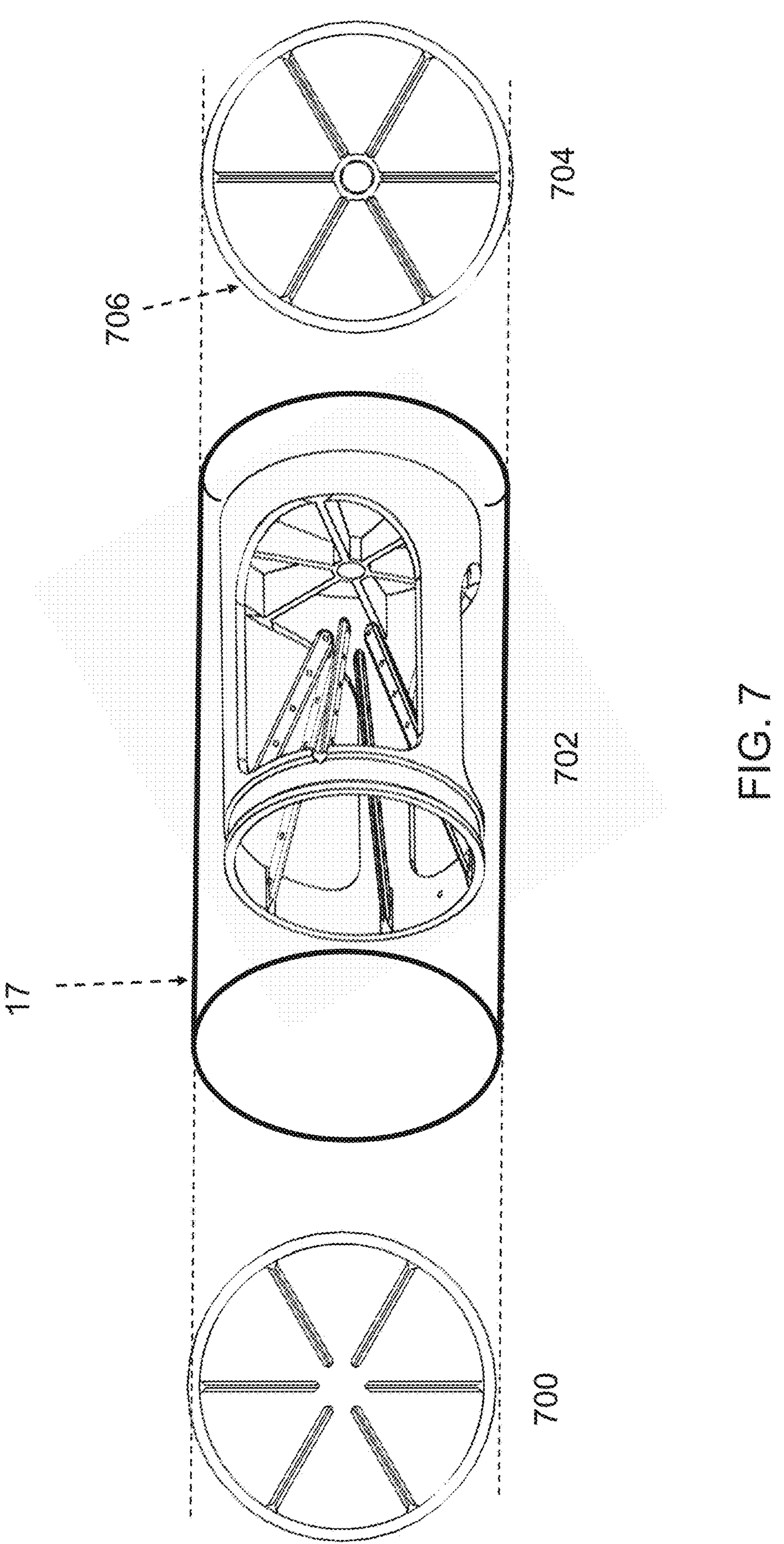
FIG. 7: Further detail of the design of an ion focusing funnel. The device of FIG. 7 resides inside of a cylindrical cage (center). End views reveal the structure of the arms of FIG. 6.

An end view of the entrance to ion focusing funnel 14 is illustrated in FIG. 7 by 700. Six ribs are equally distributed around the circumference of entrance section 600 and extend from the inner diameter of 600 towards the longitudinal center line of 600. 7022 illustrates that component 700 is a feature of a larger assembly, shown by an isometric rendering of a feature that holds focusing funnel 14 in communication with exit assembly 704. Six ribs extend from the inner diameter of 704 towards the center of 704 where the ribs attach to a centered ¼" id cylinder 706. Cylinder 706 is a fixture for securing an ion collection pedestal in the center of the exit of the funnel.

Figure 8A:
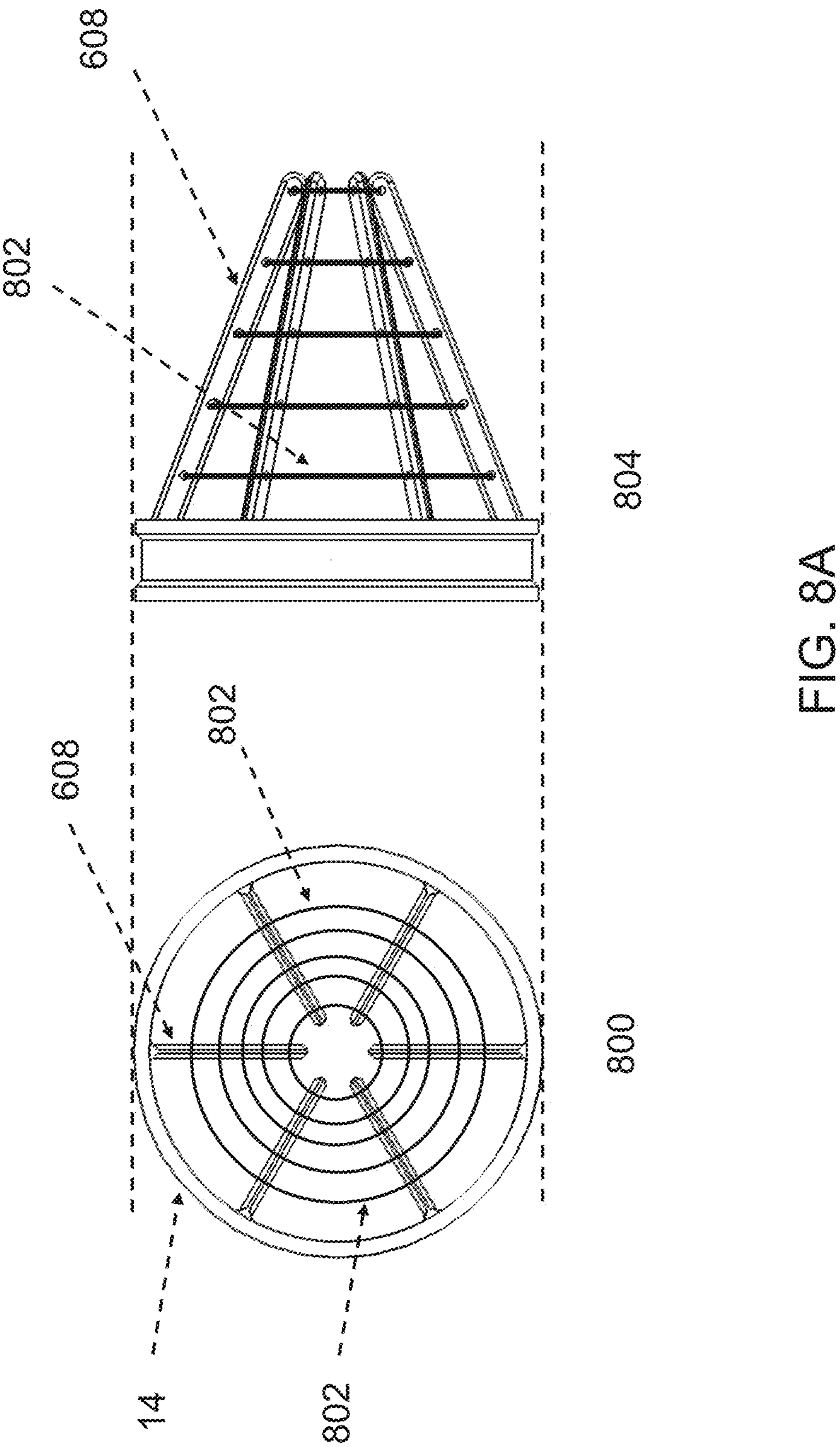
FIG. 8A: An illustration in further detail of the device in FIG. 6 revealing a means for securing wire rings with arms from the device in FIG. 6.

A further illustration of an embodiment of ion focusing funnel 14 is presented in FIG. 8A where drawing 800 shows an end view of the entrance to ion focusing funnel 14. Lines drawn along radii in 800 are ribs 608 that hold wires. Wires 802 are represented in 800 with circles. Drawing 804 illustrates the attachment of wires 802 to the ribs of focusing funnel 14. It can be understood that reference to wires is synonymous with wire rings.

Figure 8B:
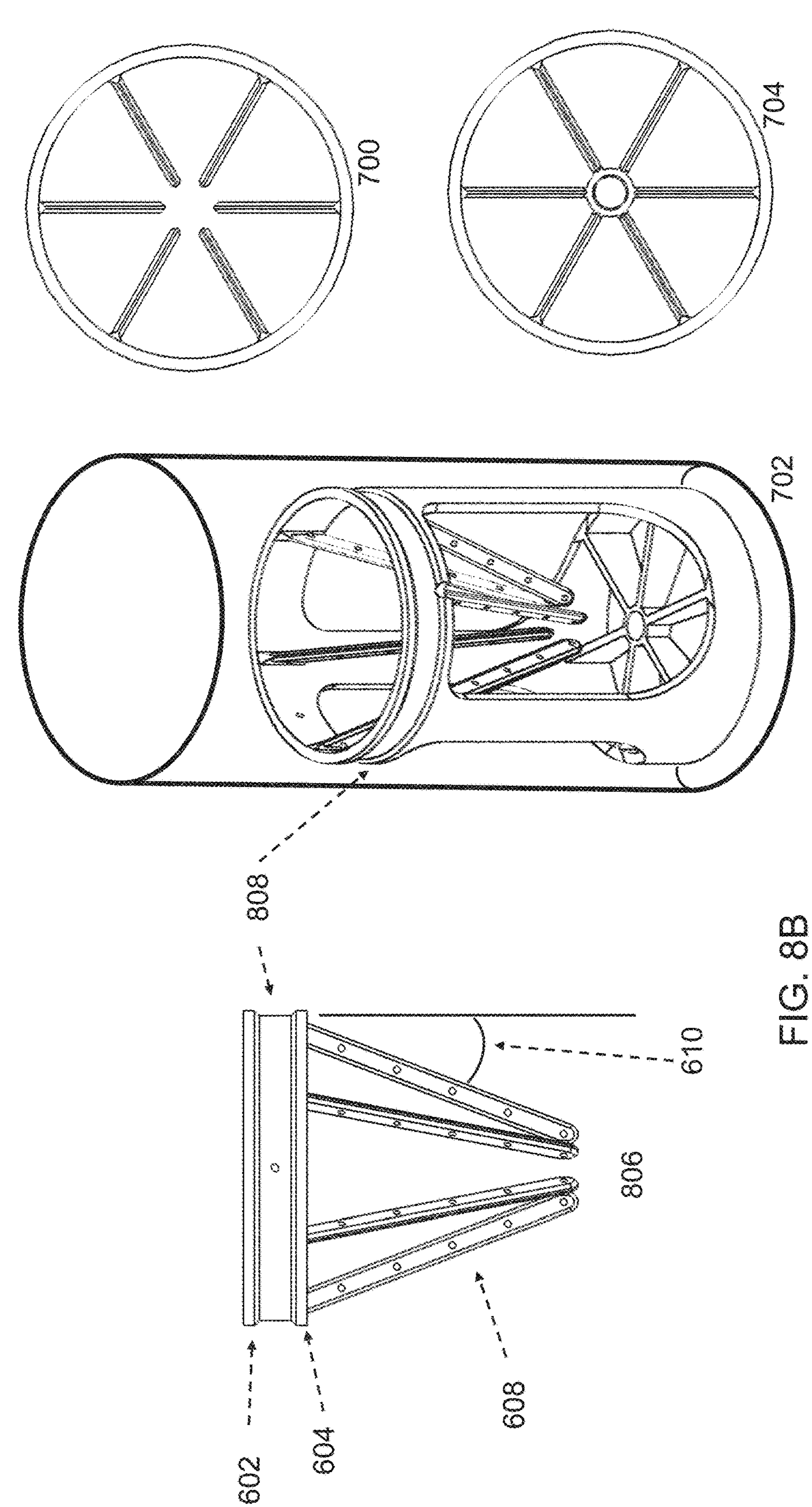
FIG. 8B: Further detail of the device in FIG. 7 and FIG. 8A.

Additional views of funnel 14 are illustrated in FIG. 8B. 806 is a side view of a 3-D printed part that holds metal band 808 and ribs 810. Illustration 700 and 704 show end views of funnel 14.

End view 700 is a view projected into the entrance of the funnel and reveals ribs 608 of funnel 14 extending from entrance ring 808 towards the small end of funnel 14. The tilt of the ribs with respect to the centerline of the part is described with angle 610. In a preferred embodiment, angle 610 is 42 degrees. End view 704 reveals a configuration that looks like spokes in a wheel. The spokes, not to be confused with ribs in end view 700, extend from the outer circumference of 604 towards the center of the part where they meet to provide a circular support for maintaining a pedestal, not shown, while inserted through the circular support, in a centered position. The center panel in FIG. 8B provides an isometric view of focusing funnel 14 and reveals the location of ribs and spokes.

Figure 9:
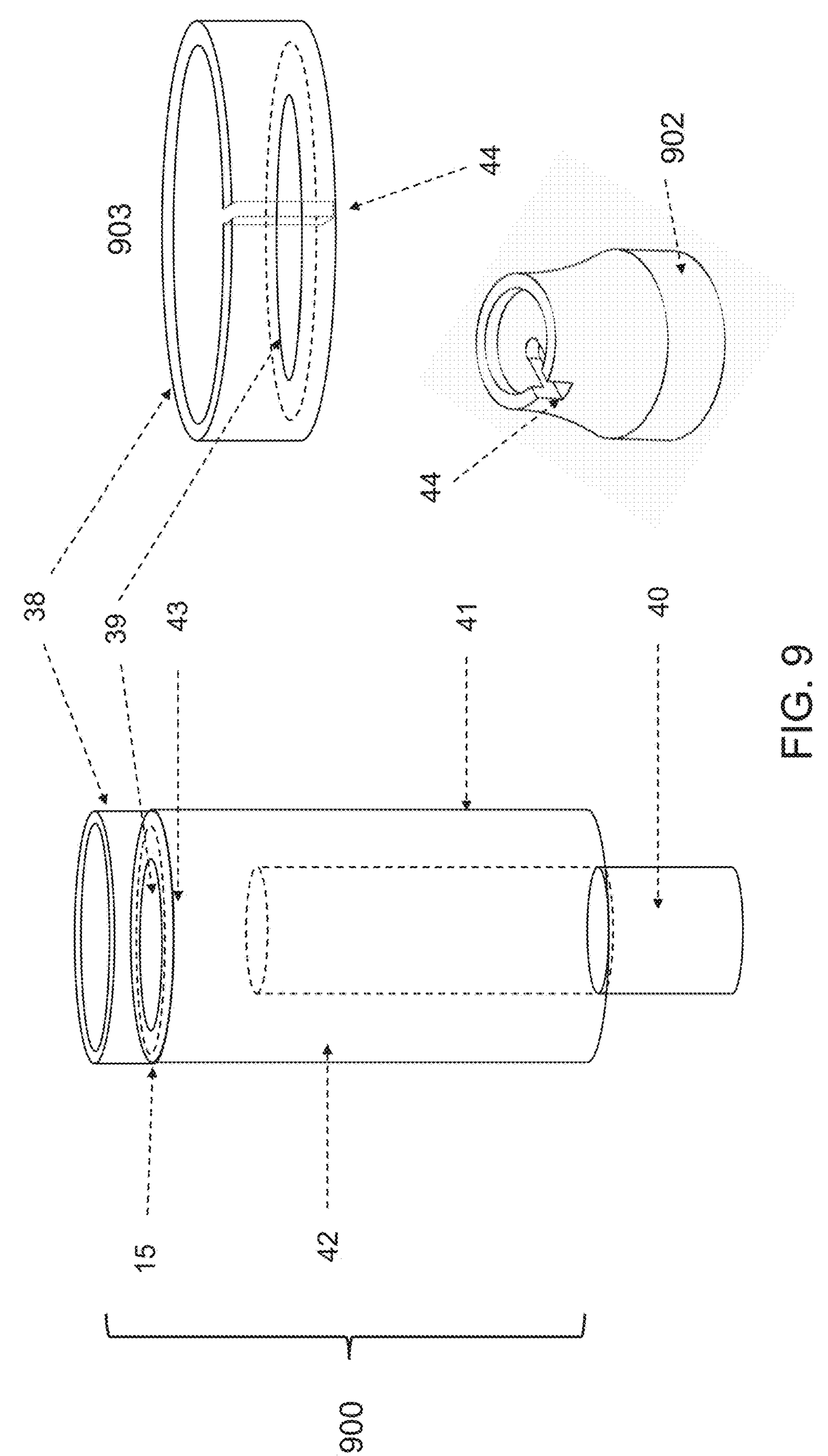
FIG. 9: Illustration of a fixture for holding a substrate onto which ions or charge particles are deposited.

FIG. 9 illustrates fixture 900 for holding a collection surface onto end 15 of rod 16 or onto the end of tube 41. A short tubular section 38 attached to the end 15 of rod 16 secures a cryo-EM grid 39 against the end 15 of the rod 16. In a preferred embodiment, the rod and the tubular section have outside diameters of 0.25". The height of the tubular section is 0.031", the inside diameter of the tubular section is 0.25" and the diameter of the cryo-EM grid is 0.118" (a 3-mm grid). Outer tube 41 and inner tube 40, along with devices for securing a cryo-EM grid, are collectively referred to as pedestal 900. Fixture 902 further illustrates another means for securing a cryo-EM grid onto the end of the ion-collecting pedestal. The widest diameter of 902 is ¼" and attaches to the end of a rod or tube, aka a pedestal, by means of glue or a section of threaded rod, such as a ¼" long 4-40 set screw. Fixture 902 has a top section to accommodate securing a cryo-EM grid, a tapered transitional section for accommodating attachment to a larger diameter rod. The top feature is a shallow counter-bored chamber designed to hold a cryo-EM grid. A slot provides access with a tweezers to a collection surface installed in the chamber. The taper of fixture 902 from a 0.25" diameter to a 0.15" diameter serves to diminish the cross section of the fixture so the cross-section interacts minimally with the flow stream of ion laden air, thus providing guidance for ions to strike the cryo-EM grid without introducing turbulence into the flow of ion laden gas that would decrease the deposition efficiency. Those skilled in the practice and design of gas dynamics and the flow of gas around objects understand that minimizing the cross section of the pedestal minimizes the redirection of gas flow stream lines wherein dispersed stream lines are not beneficial for guiding ions onto a collection surface because dispersed stream lines guide ions away from the cryo-EM grid.

In another embodiment, rod 16 or tube 41 is fabricated from an electrically insulating ¼" od diameter tube such as white Delrin. The Delrin tube provides a means to electrically isolate a collection surface, such as fixture 902, attached to the end of the Delrin tube. In this configuration, a shielded cable passes through the bore of the Delrin tube and the electrically conducting inner member of the shielded cable is attached to fixture 902. The cable provides a means to connect electrically fixture 902 to a picoammeter, such as a Keithley model 6400 picoammeter, for the purpose of measuring an ion current during the time ions are guided to land onto fixture 9092 or onto a cryo-EM attached to fixture 902. Measuring an ion current during the time ions are guided to land on a cryo-EM grid provides information useful to calculate the total number of ions deposited during a given collection time interval.

In one embodiment, fixture 902, rod 16, is replaced with a tube assembly consisting of an inner tube 40 and an outer tube 41, as illustrated in FIG. 9. A cooling fluid, such as a chilled antifreeze solution or liquid nitrogen blow off gas is conducted into inner tube 40 in a manner that provides cold gas or liquid to contact the surface underneath the cryo-EM grid 39 for the purpose of cooling cryo-EM grid 39. The cooling fluid then passes through the annular space 42 between the tubes and is either discarded or returned to the source of cooling fluid. A temperature sensor 43 located on the surface underneath cryo-EM grid 39 provides a signal useful for controlling the temperature of cryo-EM grid 39. In further detail, the tubular section 38, as illustrated in 903, is provided with slot 44 so a device such as a tweezers can be inserted through slot 44 to pick up or drop off a cryo-EM grid.

Figures 10A, 10B:
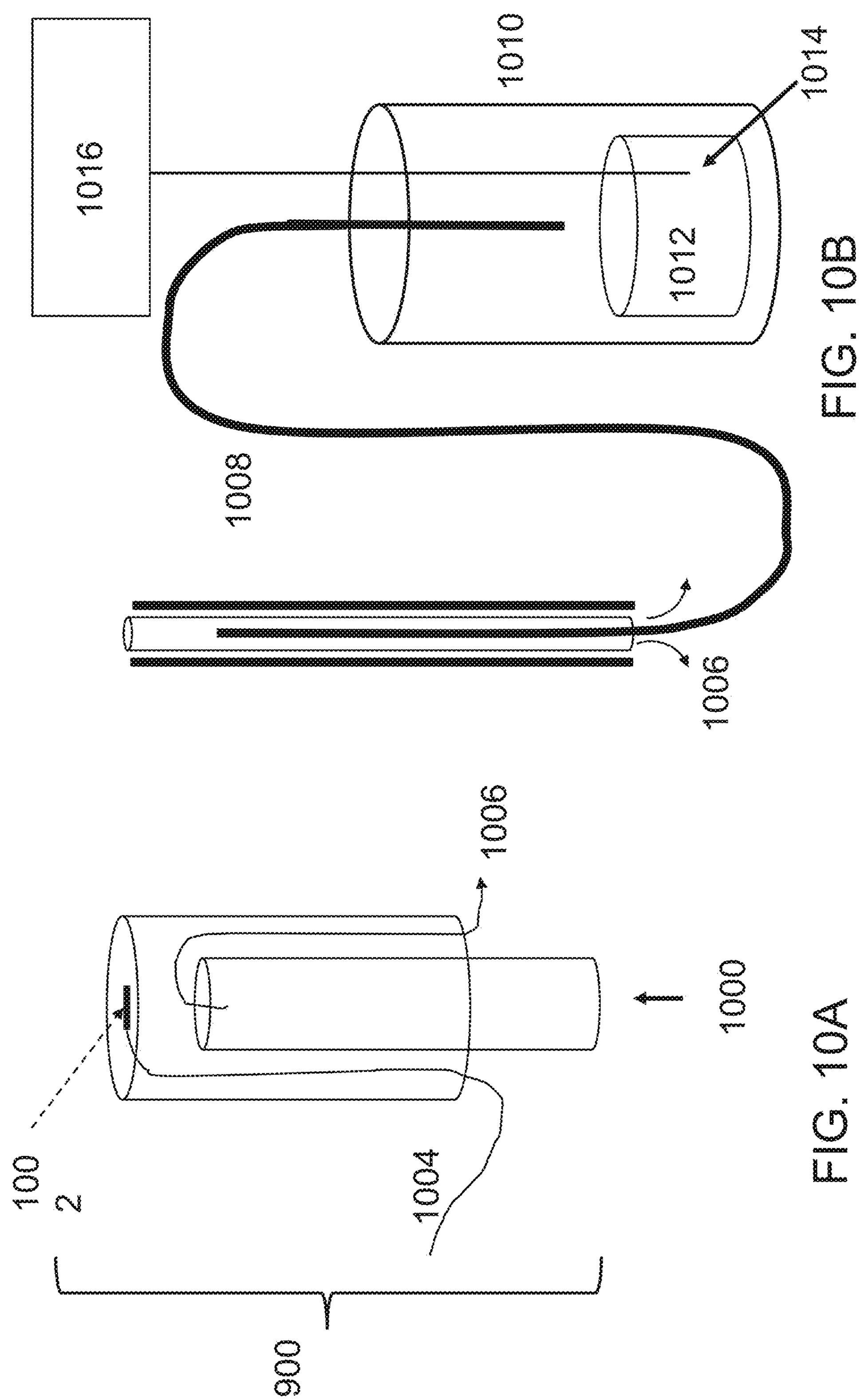
FIG. 10A: Illustration of a means for chilling a substrate while measuring the temperature of the substrate.
FIG. 10B: Illustration of a method and device for generating LN2 blow-off gas and a means for conducting the blow-off gas to a substrate holder.

A means to flow a cryogen through pedestal 900 is illustrated in FIG. 10A and FIG. 10B. Delivering cryogen 1000 using inner tube 40 and outer tube 41 provides cooling to the end of pedestal 900 onto which a cryo-EM grid can be mounted. Temperature sensor 1002 is mounted onto the interior side of the end of pedestal 900. The temperature sensing element can be any one of a thermistor, a platinum resistance temperature sensor or a thermocouple. The temperature sensing element is connected to a temperature read-out device by means of wires 1004 that pass through the annular space between inner tube 40 and outer tube 41. The temperature read-out device can be a digital temperature display, including a provision to amplify the temperature signal for the purpose of providing an auxiliary signal that can be used to control the flow of cryogen. Controlling the flow of cryogen provides a means to establish a specific temperature for cooling the cryo-EM grid. It can be understood that a higher flowrate of cryogen will provide a lower temperature while a lower flow rate of cryogen will provide a higher temperature. An example of a means to control the temperature of the end of the pedestal is a temperature controller such as available from Omega Engineering, Norwalk, Connecticut. The temperature controller receives a temperature signal, such as a mV signal generated by a thermocouple, and opens or closes an electric switch useful for controlling the flow of cryogen. The final temperature established at the end of the pedestal is a function of the flow of cryogen, the thermal mass of the end of the pedestal and the flow of ion-laden gas passing over the end of the pedestal.

Figure 10C:
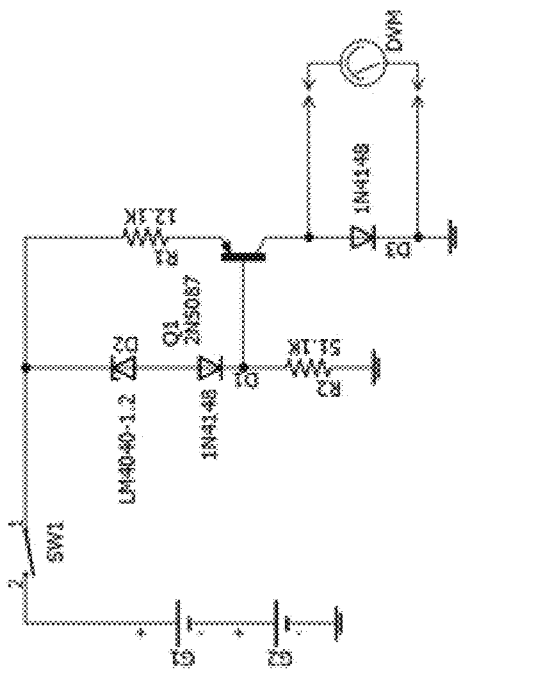
FIG. 10C: Electrical circuit diagram for providing heat to liquid nitrogen for the purpose of generating liquid LN2 blow-off gas.

In one embodiment, the flow of cryogen 1000 is delivered to pedestal 900 by means of inner tube 40. After exiting the end of inner tube 40, located inside of outer tube 41, cryogen 1000 flows through the annular space between inner tube 40 and outer tube 41 and escapes out of the open end of outer tube 41 as illustrated by 1006. Cryogen is delivered to pedestal 900 by means of insulted tube 1008 connected to dewar 1010. In one embodiment, the dewar holds liquid nitrogen 1012 and the inner tube is sealed to dewar 1010 so that the end of inner tube 40 extends into dewar 1010 in a manner that allows the liquid nitrogen blow-off gas to enter inner tube 40. Liquid nitrogen does not enter inner tube 40. It can be understood that liquid nitrogen in dewar 1010 will slowly boil and produce cold nitrogen blow-off gas. A feature of the apparatuses described in this disclosure is to control the rate at which the liquid nitrogen boils. By controlling the boiling rate, the flow of blow-off gas is controlled. A means for controlling the liquid nitrogen boiling rate is illustrated in FIG. 10A through FIG. 10C. Heating element 1014 is submerged into liquid nitrogen 1012 and an electrical current provided to heating element 1014 causes the liquid nitrogen to boil. The amount of heat provided to the liquid nitrogen is controlled by temperature control module 1016. An example of an electrical circuit for providing heat to the liquid nitrogen is illustrated in FIG. 10C. It can be understood that the batteries in the circuit schematic are lithium-ion batteries (e.g., type 1650 batteries) and that the resistors are metal film resistors with ohmic values+/−1% of the indicated value. It can be understood that the DVM in the circuit schematic is useful for temperature indication by converting the indicated resistance to temperature using a temperature to resistance conversion equation. In one embodiment, the switch (SW1) in the electrical circuit can be replaced with the switch closure connections on a temperature controller (e.g., Omega Engineering). It may also be understood that the heating element in FIG. 10B is the circuit component labeled 1N4148, which is a reverse-biased diode. Controlling the liquid nitrogen boiling rate is not limited to the use of the heater and heater circuit illustrated in FIG. 10C. A simple combination of an electrical resistor, such as a 100 K-ohm resistor and an adjustable low voltage power supply will provide another means to add heat to the liquid nitrogen by passing a current through a 100 K-ohm resistor submerged in the liquid nitrogen. Increasing the voltage provided by the power supply will increase the boiling rate and decreasing the voltage with decrease the boiling rate. The use of the circuit illustrated in FIG. 10C provides automatic control of the temperature of fixture 902.

Figure 11:
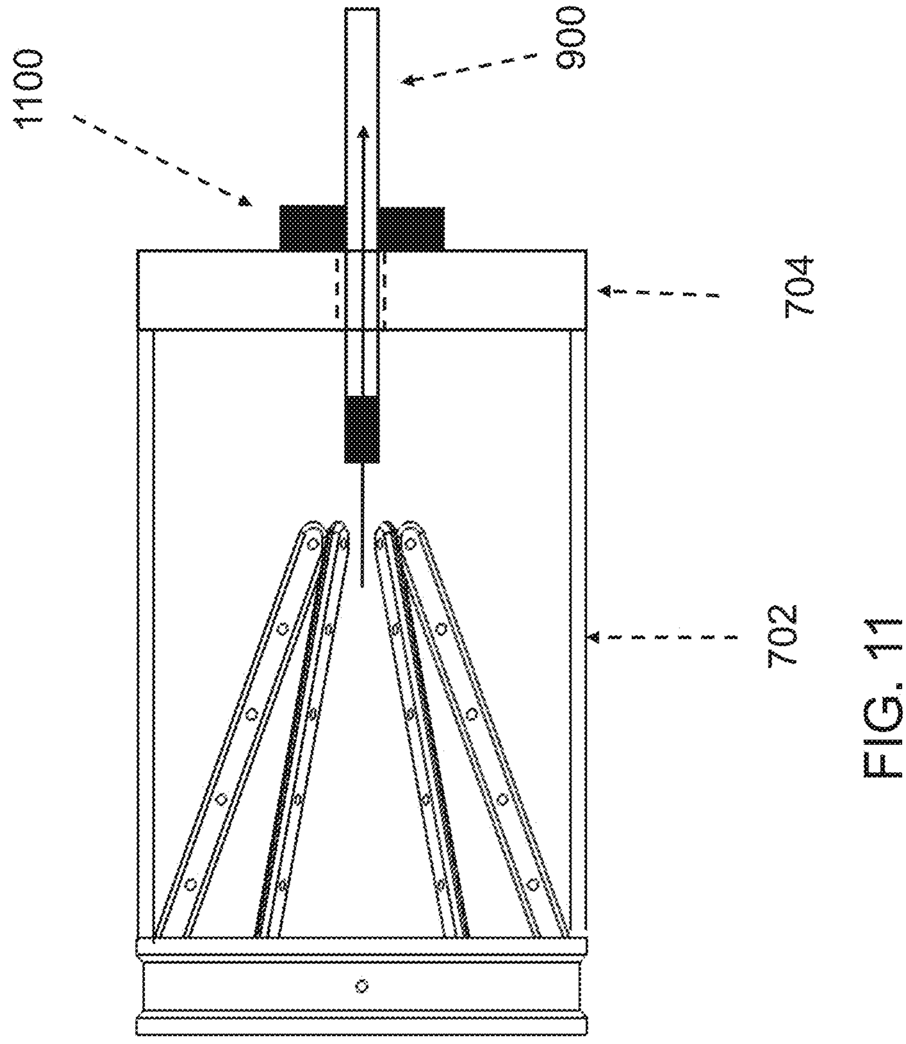
FIG. 11: Further illustration of the FIG. 7 device showing the position of a ion or charged particle collector.

FIG. 11 illustrates another feature of ion focusing chamber 9 and component 702 (FIG. 7). A means is needed to insert and remove pedestal 900 from ion focusing chamber 18 before and after ions are deposited onto a cryo-EM grid attached to the end of pedestal 900. It can be understood that pedestal 900 slides through an opening 706 in 704 and that said opening 706 provides a means to align the longitudinal centerline of pedestal 900 with the longitudinal centerline of focusing funnel 9. It is also necessary to position the end of pedestal 900 at a predetermined distance downstream of the smallest ring in focusing funnel 14. A stop collar 1100 is attached to pedestal 900 to control the length of pedestal 900 that can be inserted into 702. The stop collar also serves as a safety feature and prevents pedestal 900 from being inserted too far and creating an electrical discharge in the event pedestal 900 were to touch the smallest ring of focusing funnel 14.

Figure 12:
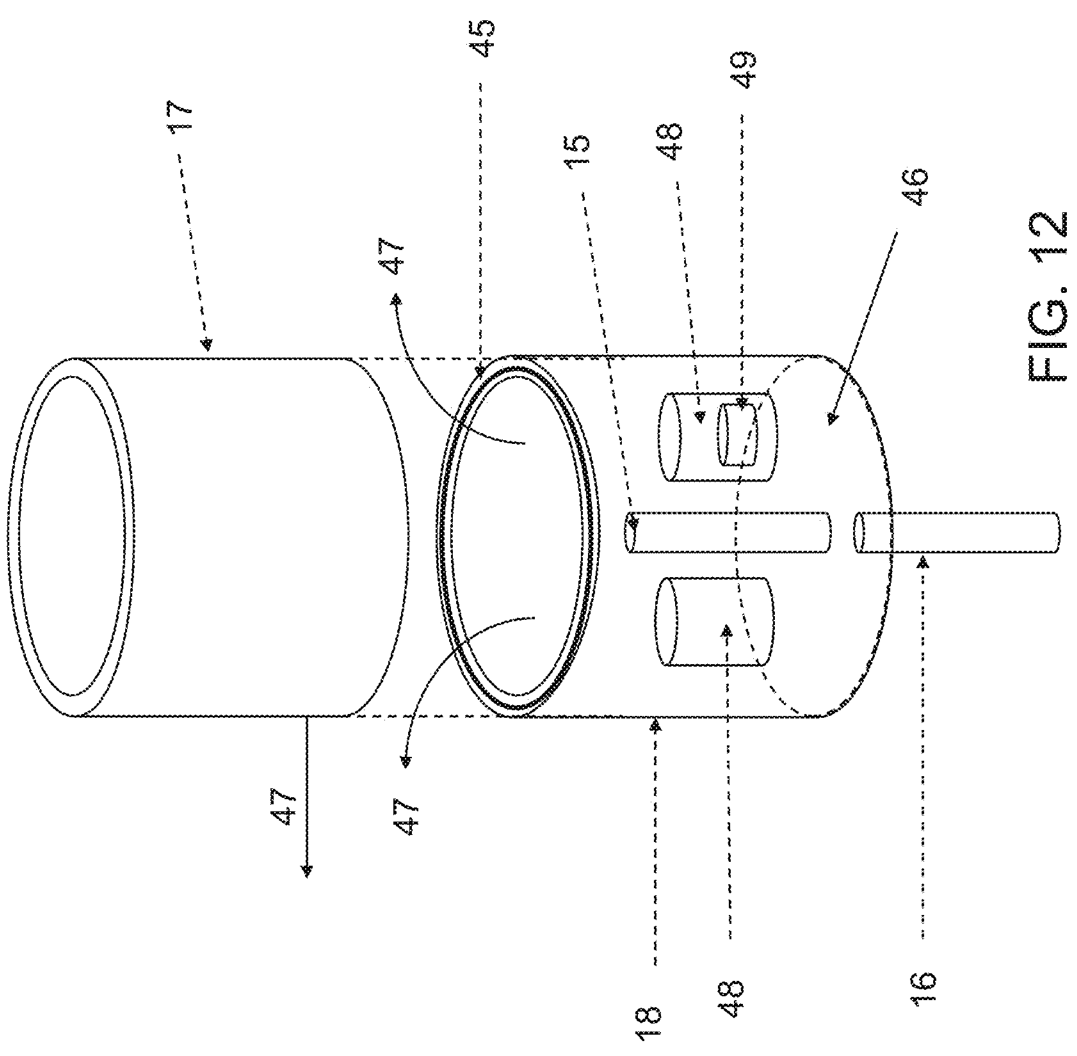
FIG. 12: Illustration of a two-part cylindrical chamber useful for protection ions or charged particles deposited onto a collection substrate.

Referring to FIG. 12, cylindrical chambers 17 and 18 provide a means to protect ions from exposure to room air after they have been deposited onto a cryo-EM grid. Chambers 17 and 18 a large enough in diameter to afford an operator adequate volume to carryout tasks related to loading, unloading and transferring sample substrates from or into transfer cases are into ancillary chambers for preserving the samples. An adequate size for each of these chambers is 6" diameter and 10" height. Those skilled in the art of cryo-EM analysis will understand the need to preserve samples at a low temperature, particularly protein molecules. After ions are deposited onto a cryo-EM grid, it is necessary to preserve the ions by storing them in liquid nitrogen. To do so, the loaded cryo-EM grid is removed from the end 15 of rod 16 and plunged into a vial of liquid nitrogen maintained inside of chamber 18. Chamber 17 is designed to mate with chamber 18 in way that allows the two chambers to be assembled or disassembled easily. Chamber 17 is equal in diameter to chamber 18, allowing chamber 17 and chamber 18 to align end-to-end to form a single cylinder. Securing o-ring 45 in position with an o-ring groove in the end wall of chamber 18 provides a means to seal the two cylinders together. When the two chambers are attached together, a flow of dry air or liquid nitrogen blow-off gas provided by a gas source 46 passes through chamber 18 and exits through port 19 on chamber 17. When chamber 17 and chamber 18 are disassembled, the flow of gas from 46 exits out of the top of chamber 18 as depicted by 47. By withdrawing end 15 of the rod 16 into the interior of chamber 18, end 15 of rod 16 is bathed in liquid nitrogen blow-off gas provided by 46, allowing chambers 17 and 18 to be disassembled without exposing rod 16 or cold finger 41 to humid room air. Bathing a cryo-EM grid attached to end 15 of rod 16 in dry gas provided by 46, prevents water vapor from condensing onto a cryo-EM grid when it is attached to end of cold finger 41. A cryo-EM grid attached to the end of 41 can then be picked up with a tweezers and transferred into vial 48 located inside of chamber 18. In one embodiment of the technology described in this disclosure, vials 48 hold an EM-grid holder(s) 49 and contain liquid nitrogen.

Theoretical validation of the design of focusing funnel 14 can be provided with SIMION simulations of the trajectory ions follow as they pass through the focusing funnel. SIMION software is commercially available through Scientific Instrument Services (SIS), Ringoes, NJ. In order to simulate ion trajectories in the apparatuses described in this disclosure, an SDS user program, also available from SIS was modified to support the implementation of a range gas velocities predicted to carry ions through the focusing funnel. Those knowledgeable about the use of computational fluidics dynamics models to simulate gas emanating from a port that protrudes into a surrounding chamber will recognize that the emanating flow will diverge. The extent to which the flow diverges depends of gas conditions such as gas pressure, gas flow rates, the diameter of the port, the physical size of the chamber and the rate at which gas is exhausted from the chamber. Additional parameters may be introduced into simulations of fluid flow to make them more accurate, such as molecular weight of the gas, pressure differences throughout the chamber, gas temperature and whether or not the flow is laminar or turbulent.

Figure 13:
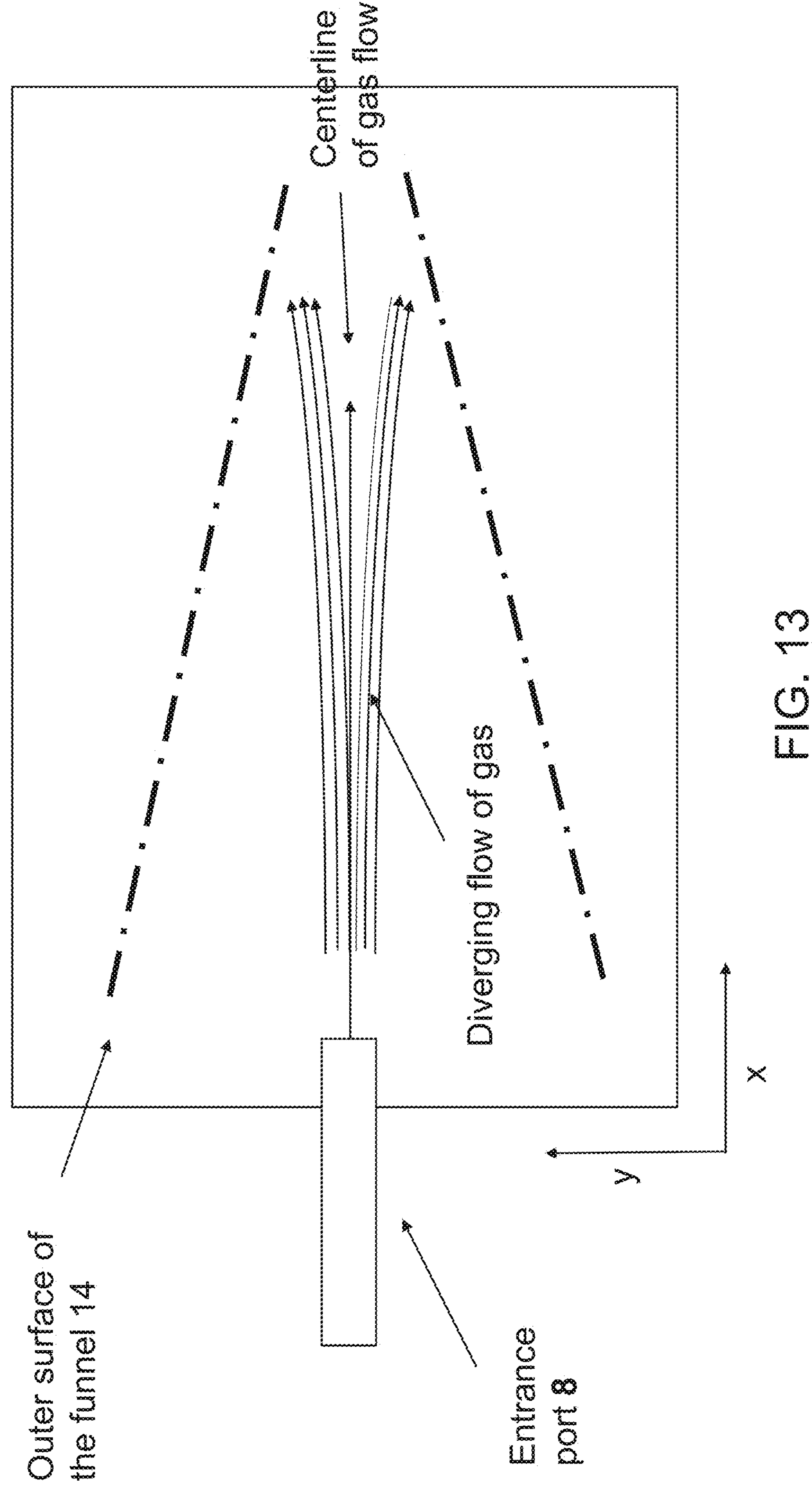
FIG. 13: Illustration of a connection between the exit of a nDMA and the entrance to an ion focusing funnel. Curved lines represent a diverging flow of gas.

To simulate the flow of gas in the apparatuses described in this disclosure, it was assumed that the flow of gas in the focusing funnel was laminar, occurred at atmospheric pressure inside a port and chamber maintained at room temperature. It was further assumed that the flow of gas emanating from port 8 positioned along the centerline of focusing funnel 14 expands as it flows through focusing funnel 14, as illustrated in FIG. 13. FIG. 13 shows gas flow streamlines emanating from port 8 and a radial expansion of the flow as the gas passes through focusing funnel 14. In addition to the ion-laden flow of gas conducted by port 8 into focusing funnel 14, a sheath flow provided by conductor 11 joins with the ion-laden flow. The following simulations used a simple mathematical expression to model the expansion of gas emanating from port 8. It can be understood that flow of ion-laden gas expands around a center line of the focusing funnel. A mathematical condition was established to simulate the expansion of the flowing gas using the expression y-velocity=2e-6*(x-position−5.1)/ion-sequence number^2. Those skilled in the practice of CFD will understand this is a simplified expression and that more accurate expressions are available in the scientific literature. This simple expression adequately simulates the expansion of the gas flowing through the focusing funnel and provides initial estimates for the magnitudes of voltages needed to effect ion focusing in the ion focusing funnel.

FIG. 14 through FIG. 23 illustrate SIMION simulations of ion trajectories as a flow of ion-laden gas is guided through focusing funnel 9. The flow of gas carries the ions though the funnel while voltage applied to electrodes in funnel 9 cause the ions to be guided towards the centerline of funnel 9. In FIG. 14 through FIG. 23, figure headings reveal the ion focusing conditions. It should be understood that 'voltage applied to the focusing funnel' or the use of related phrases refers to the voltage applied to the smallest ring in the on focusing. Referring again to FIG. 5, the voltage divider 30 is provided with a voltage at one end and a connection to an electric ground at the other end. "Voltage applied to the focusing funnel' refers to the voltage applied to the divider which is also provided to the smallest ring in the funnel 14. The voltage divider 30 distributes voltages to each ring in the funnel 14.

In FIG. 14 through FIG. 23, the left-hand panels illustrate ion trajectory simulations when the voltages indicated in the headings are applied to the electrode rings comprising the focusing funnel. The right-hand panels in these figures illustrate for the purpose of comparison ion trajectory simulations when voltage is not applied to the electrode rings in the focusing funnel. The right hand-panel is reproduced in FIG. 14 through FIG. 23. The small squares in these figures represent the location of the focusing wires and it can be understood that the squares reveal a cross-sectional view of an x-y plane cut along the centerline of the focusing funnel. For further clarification, the ring electrodes are illustrated in FIG. 8 with thick vertical lines. The left-panels in FIG. 14 through FIG. 23 show simulated ion trajectories while voltage is applied to funnel 14. Ion trajectories are represented with solid black lines. Dots superimposed on the trajectories represent timing marks. Ions flow left to right in apparatuses described in FIG. 14 through FIG. 23 and the left to right sequence of dots in these figures indicates the position of an ion every subsequent 10 milli-second interval. A 5×5 cluster of small squares near the right-hand side of each panel represents a pedestal onto which ions are deposited. A cryo-EM grid can be mounted on the end of the pedestal. A 5×5 cluster of small squares near the left-hand side of each panel represents the port through which ions enter the funnel 14.

Figure 14:
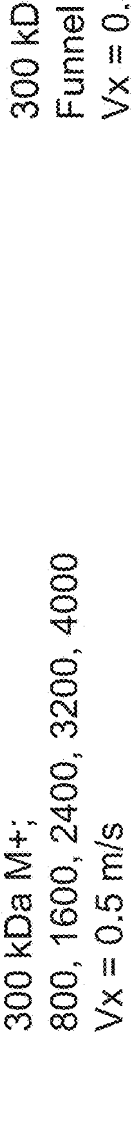
FIG. 14: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

The performance of the ion focusing funnel 14 with respect to the magnitude of the voltages applied to the funnel 14 and the actualization of ion focusing is presented in FIG. 14 through FIG. 23. Ion-laden gas is conducted into the ion focusing funnel 14 and expands as it travels through funnel 14 as illustrated in FIG. 14. The flow of ion-laden gas as it emerges from the exit end of 8 is depicted by flow streamlines 34. Those knowledgeable of gas flow streamlines will recognize that streamlines are trajectories followed by a particle suspended in a flowing gas. They will also recognize that the flow exiting from tube 8 expands in diameter as it flows farther into the funnel. Ion trajectories 34 diverge because ions are dragged by the gas flow and expand as the gas flow expands. Referring now to the left panel in FIG. 14, ion trajectories continue to expand and then begin to converge onto end 15 of rod 16 due to the focusing properties of the electric field inside of funnel 14. As ion-laden gas penetrates farther into the funnel, the gas continues to expand but the ion trajectories no longer expand in region 35. An electric field inside the funnel forces the ions to move towards the longitudinal centerline of the funnel. As ion-laden gas penetrates even farther into the funnel and reach region 36, the electric field also increases and provides a stronger ion focusing effect, as depicted by ion trajectories that are focused towards the end 15 of rod 16. The focusing effect for ions in region 36 is due to the decreasing diameter of the focusing rings that imparts a stronger focusing effect on the ions in region 36.

The effectiveness of ion focusing funnel 14 can be understood by comparing the flux of ions delivered by conductor 8 to the flux of ions deposited onto the end 15 of rod 16 or onto the end of the cryo-EM fixture illustrated in FIG. 14 through FIG. 23. Ion trajectories that terminate on end 15 of rod 16 indicate a flux of ions striking end 14 and when a relatively larger number of trajectories terminate on end 15 of rod 16 it can be understood that the flux is higher. When 0 volts are applied to the exit ring of the funnel 14, no ion focusing will result. Nevertheless, a fraction of the ions delivered by conductor 8 will pass straight through funnel 14 and strike a cryo-EM grid attached onto the end 15 of rod 16. Application of a voltage to the exit ring of funnel 14 increases the number of trajectories terminating on end 15 of rod 16. Those knowledgeable in the operation of ion focusing funnels, will know that applying a higher voltage to the exit ring of the funnel 14 will guide more ions to strike the end 15 of rod 16.

Beginning with an explanation of the right-hand panel in FIG. 14, ions trajectories begin at port 8 and progress towards the pedestal. A portion of the ions near to the centerline of the focusing funnel, as illustrated by their trajectories, pass directly through the focusing funnel and strike the pedestal, but not all ion trajectories terminate onto the pedestal. The fraction of the trajectories that terminate on the pedestal is a measure of the focusing efficiency of the focusing funnel. In comparison to voltage conditions when voltage is not applied to funnel 14, the left panels in FIG. 14 through FIG. 23 illustrates the consequences of applying voltage to funnel 14.

FIG. 14 through FIG. 23 show a series of SIMION simulations using different focusing voltages, ions with different molecular weight and ions having different amounts of charge. Tocilizumab is an antibody having a molecular weight near 150 kDa can be considered as an exemplary substance to test the soft-landing apparatus.

Exemplary headings for FIG. 14 to FIG. 23:

(a) 300 kDa M+: ion mass and charge 800, 1600, 2400, 3200, 4000: voltages applied to the ring electrodes, listed in order of voltage applied to the largest ring and then to smaller rings, respectively.

(b) Vx=0.5 m/s: average gas velocity inside the funnel.

FIG. 14 illustrates the simulation of ion focusing using:

(a) a M+: ion mass and charge.

(b) 800, 1600, 2400, 3200, 4000: voltages applied serially to largest ring and to the smallest ring, respectively.

(c) Vx=0.5 m/s: average x-direction gas velocity inside the funnel, noting that gas flows from the region surrounded by the largest ring towards the region surrounded by the smallest ring.

Figure 15:
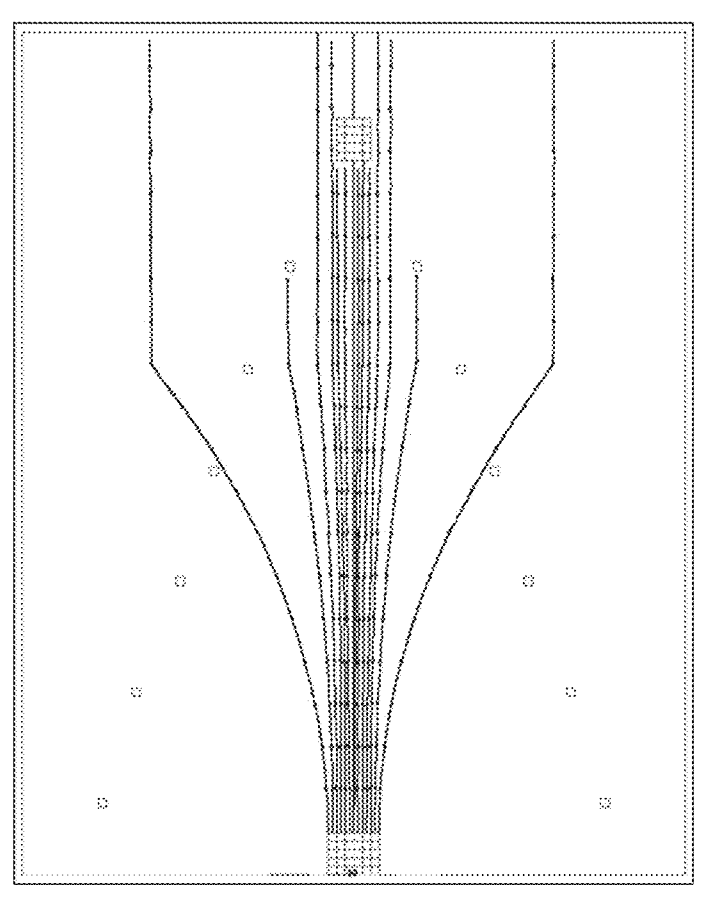
FIG. 15: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 15 illustrates the simulation of ion focusing using:

(a) a M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside the funnel.

Figure 16:
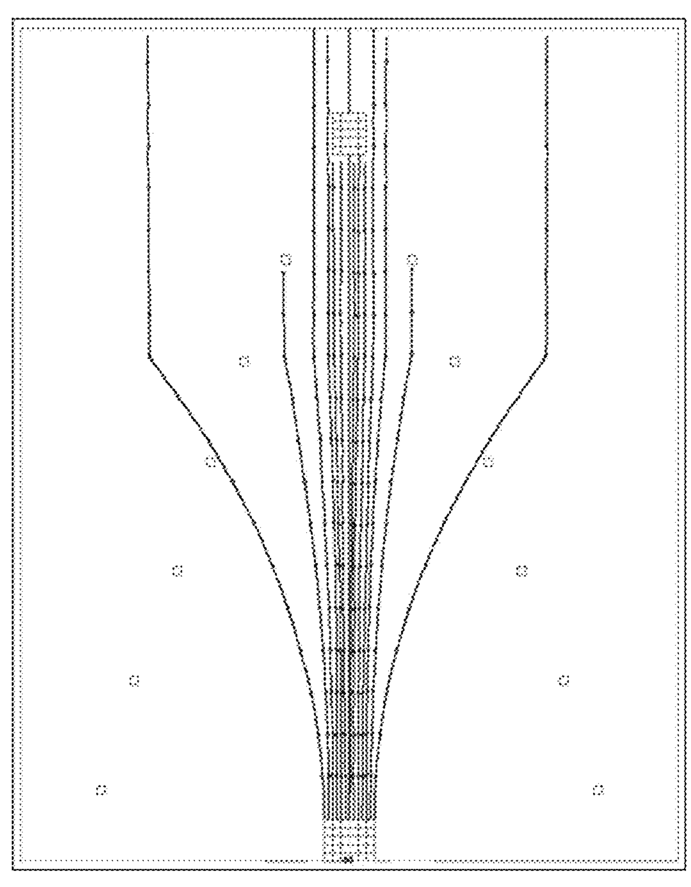
FIG. 16: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 16 illustrates conditions that block ions from entering funnel 14 using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

Figure 17:
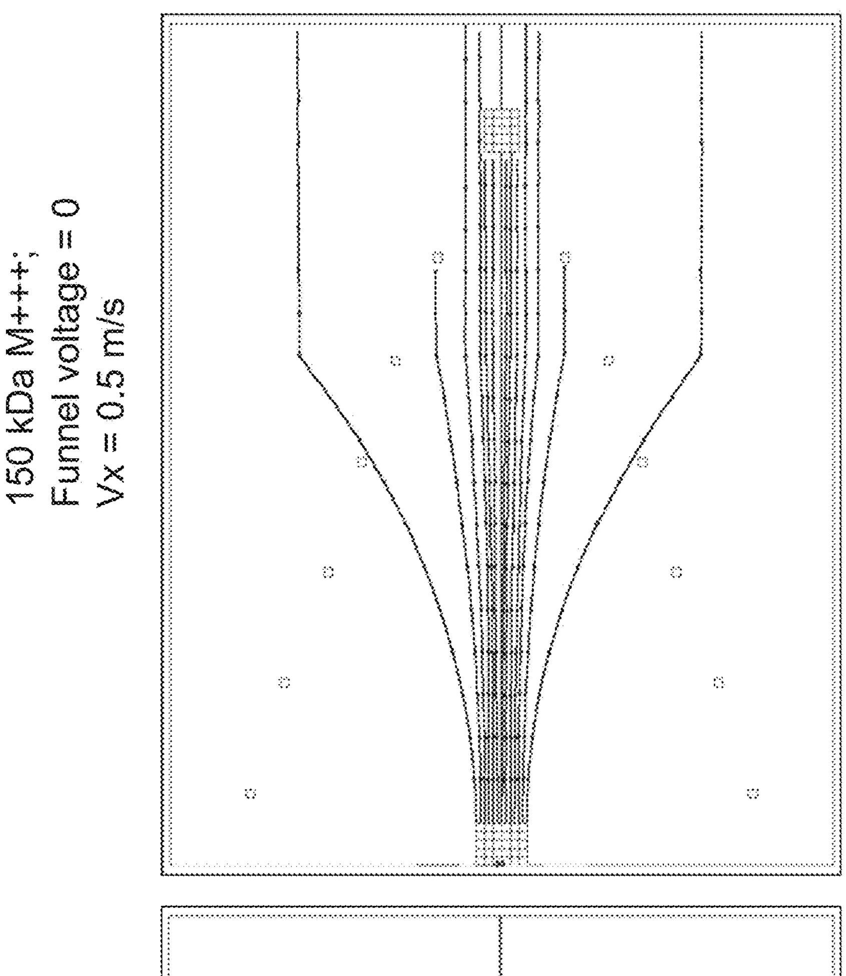
FIG. 17: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 17 illustrates conditions that block ions from entering funnel 14 using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

Figure 18:
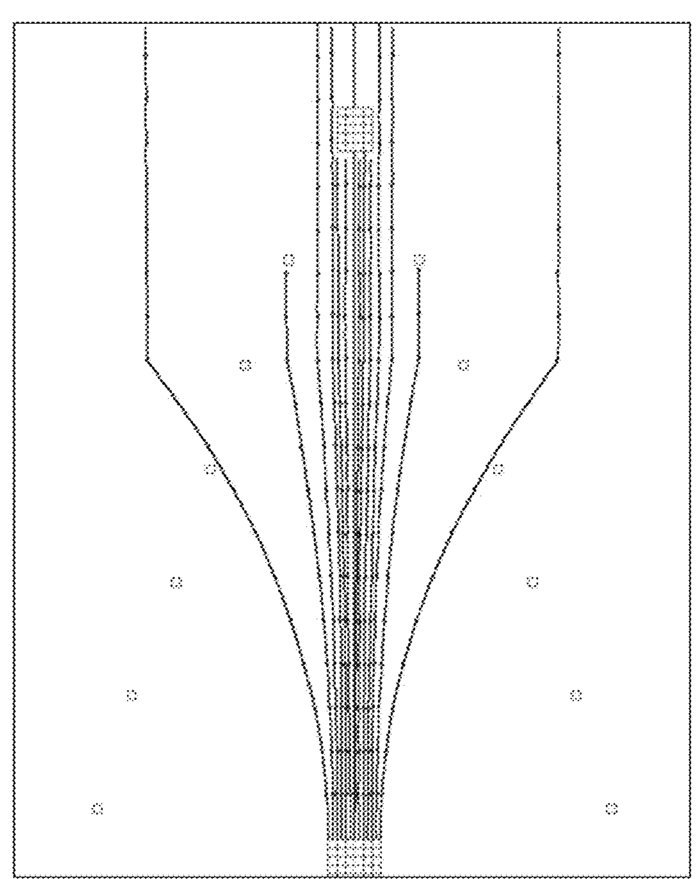
FIG. 18: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 18 illustrates the simulation of ion focusing using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

Figure 19:
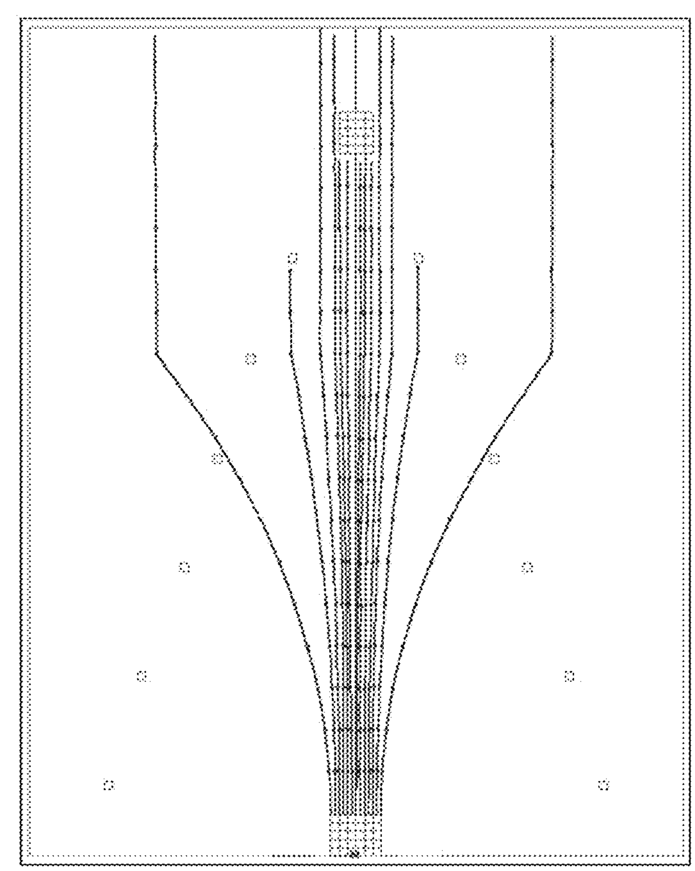
FIG. 19: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.
Figure 19:
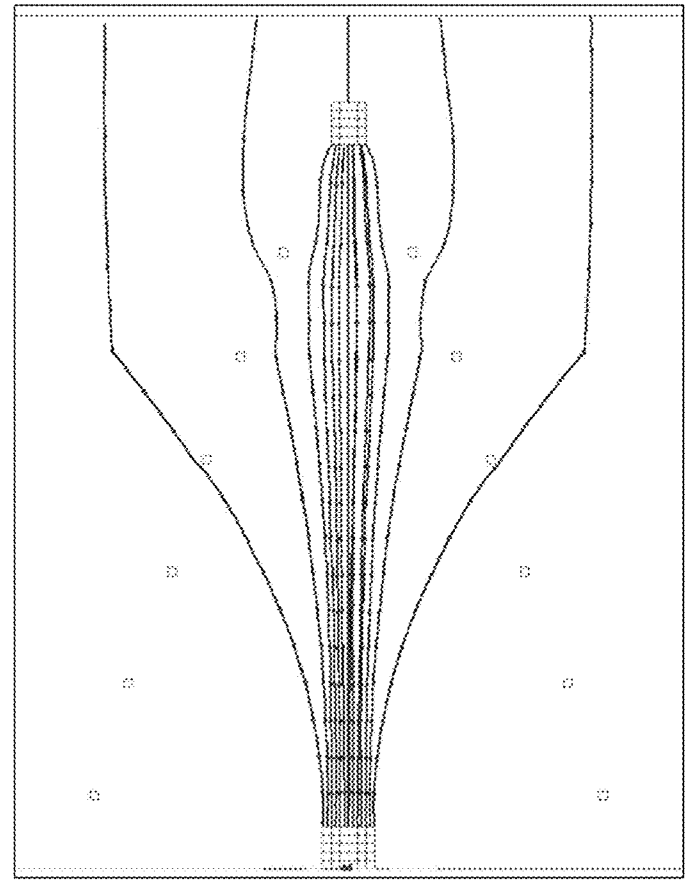

FIG. 19 illustrates the simulation of ion focusing using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside the funnel.

Figure 20:
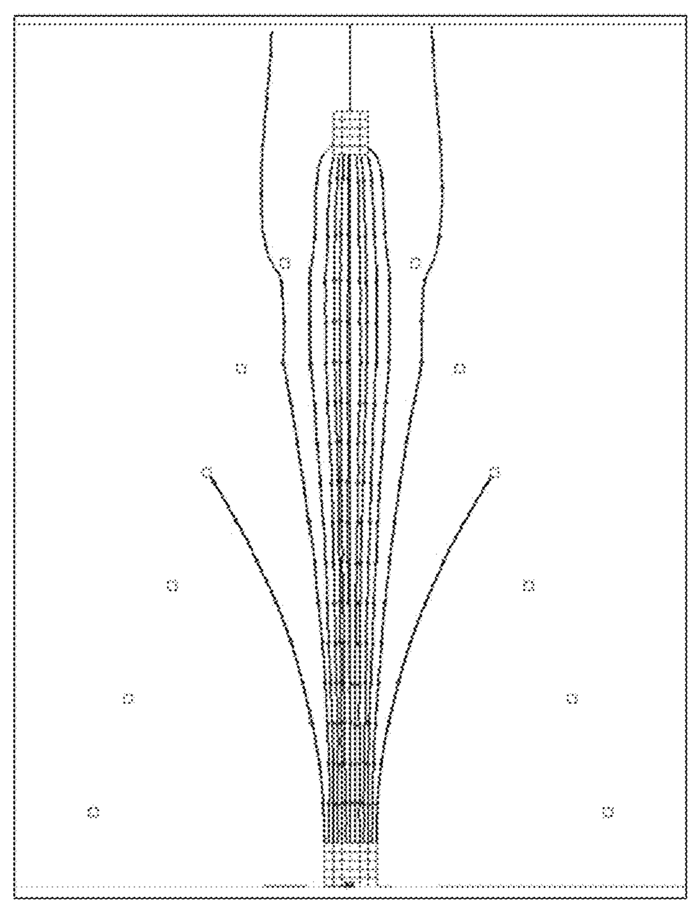
FIG. 20: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 20 illustrates the simulation of ion focusing using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

Figure 21:
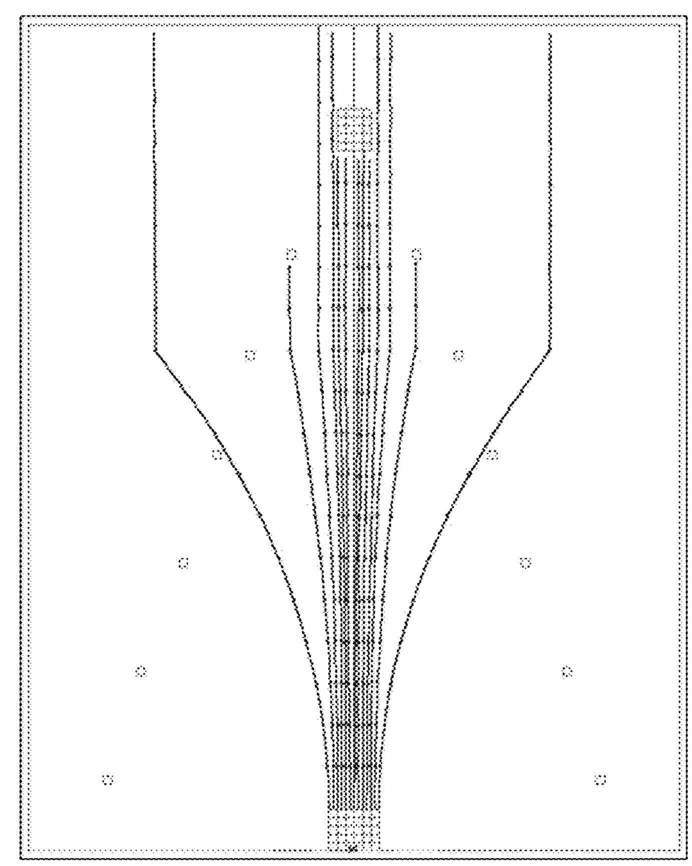
FIG. 21: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 21 illustrates the simulation of ion focusing using:

(a) 300 kDa M+: ion mass and charge (b) 800, 1600, 2400, 3200, 4000: voltages applied serially to largest ring and to the smallest ring, respectively (c) Vx=0.5 m/s: average x-direction (left to right) gas velocity inside funnel 14

Figure 22:
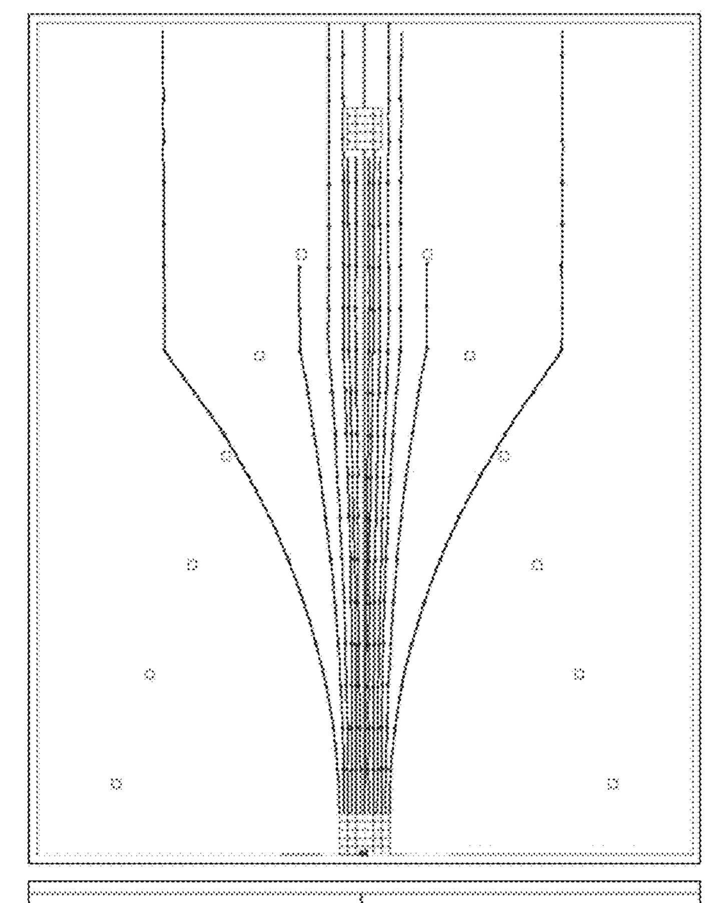
FIG. 22: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.

FIG. 22 illustrates the simulation of ion focusing using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

Figure 23:
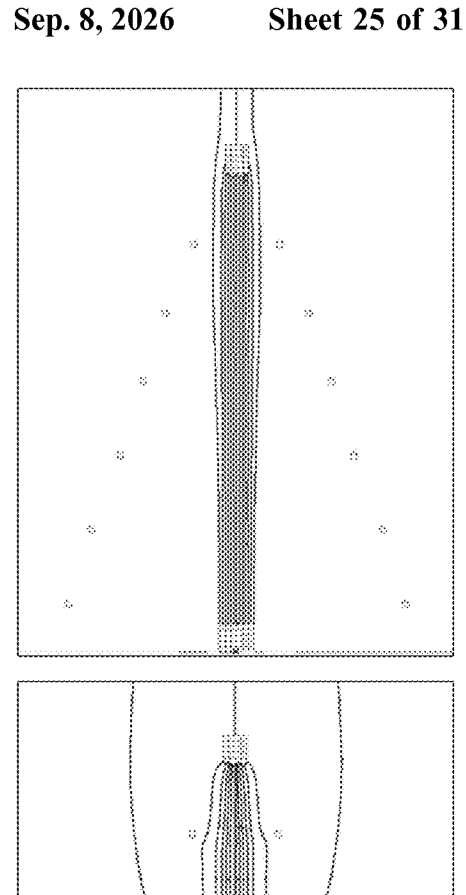
FIG. 23: Illustration of ion trajectories (solid lines) inside an ion focusing funnel. Lines of dots represent the position of an ion at different times. Small squares represent the location of circular wires comprising the electrodes in an ion focusing funnel. Conditions of gas velocity, voltages applied to the electrode rings (listed in order of largest ring to smallest ring), along with ion molecular weight and charge are listed alongside the illustration.
Figure 23:
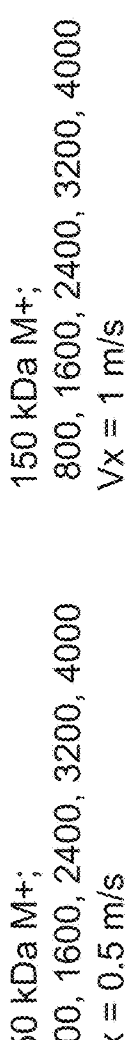
Figure 23:
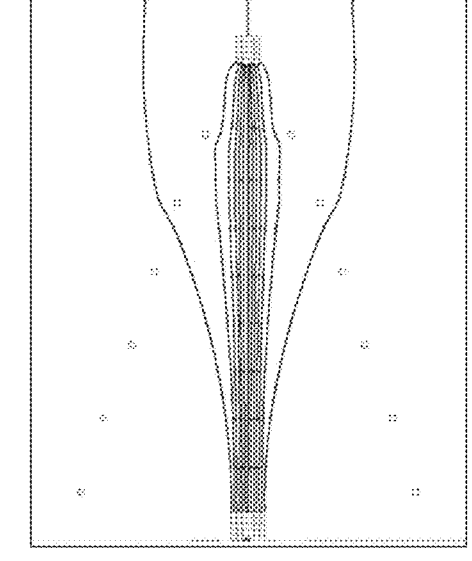
Figure 23:
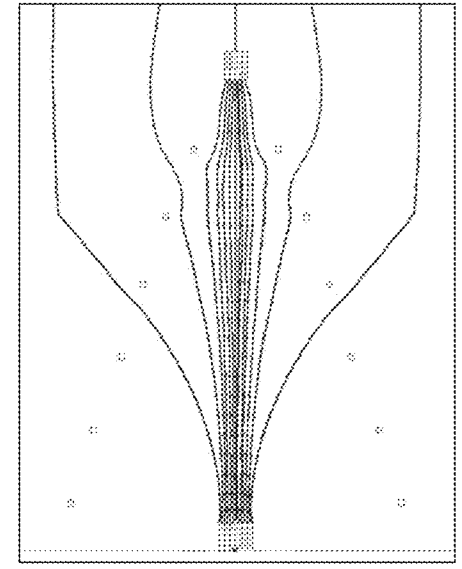

FIG. 23 illustrates the simulation of ion focusing using:

(a) 300 kDa M+: ion mass and charge.

(b) 800, 1600, 2400, 3200, 4000: voltages applied serially to largest ring and to the smallest ring, respectively.

(c) Vx=0.5 m/s: average x-direction (left to right) gas velocity inside funnel 14.

A general summary of the SIMION simulations illustrated in FIG. 14 through FIG. 23 indicates that embodiments of the apparatuses described in this disclosure provide enhanced deposition of ions onto a collection surface compared to the absence of ion focusing. It should be understood that the range of conditions investigated using SIMION simulations, along with illustrated figures do not constrain or limit the technology described in this disclosure to the implementation of only the conditions simulated. There are additional conditions outside of the range of simulated conditions of gas velocity and applied voltages that will provide ion focusing and enhanced deposition of ions onto collection surfaces, such as a cryo-EM grid. The simulated conditions, including ion trajectories illustrated in FIG. 14 through FIG. 28 not only provide a demonstration of conditions that enhance the fraction of ions deposited onto a collection surface, compared to conditions in which voltage is not applied to focusing funnel 14, but provide also a metric for quantifying the kinetic energy of the deposited ions. As stated multiple times in this disclosure, the purpose of the apparatuses described in this disclosure is to provide a means to soft-land ions and charged particles onto a collection surface. Simulations using SIMION software reveal the energy of the ions at the time they impact a collection surface. Table 1 presents ion energy at the time an ion impacts a surface for focusing conditions illustrated in FIG. 14 through FIG. 28. More particularly, Table 1 summarizes conditions simulated by SIMION software. Ion molecular weight refers to the mass of ions entered into the simulations. z represents the number of charges carried by an ion. Vx refers to background gas velocity in focusing funnel 14. Funnel voltages refer to voltages applied to the rings in focusing funnel 14 with the highest listed voltage assigned to the smallest ring. KE (kinetic energy) refers to ion energy at the time an ion strikes a collection surface. Those knowledgeable in the practice of depositing ions and charged particles onto surfaces will recognize depositions at less than 1 eV are considered to be very low energy impacts. The low impact energies listed in Table 1 provide deposition conditions known as soft landing.

Figure 24:
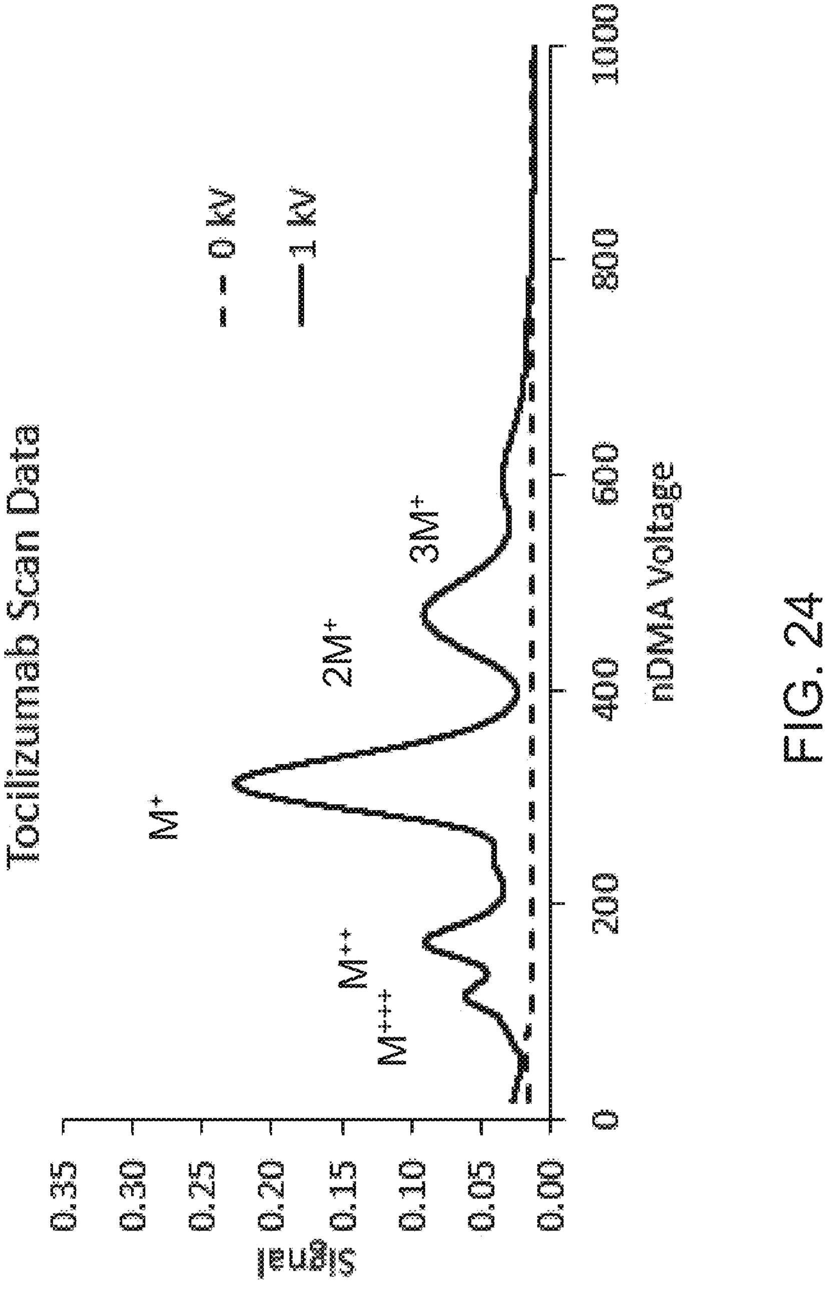
FIG. 24: Two ion mobility spectra of Tocilizumab ions, recorded while the indicated voltage was applied to the exit ring of the ion focusing funnel.

Experimental validation of the focusing effect caused by voltages applied to focusing funnel 14 is presented in FIG. 24 through FIG. 28. FIG. 24 through FIG. 28 can be understood to be ion mobility spectra in which the y-axis represents an ion current deposited onto a collection surface attached to end 15 of rod 16. FIG. 24 shows an approx. 0.02 signal (dashed line), equivalent to 0.04 picoamps produced by depositing a flux of ions onto the end 15 of rod 16 when zero voltage is applied to the exit ring of funnel 14. The flux of ions striking the end 15 of rod 16 was measured by attaching a picoammeter to rod 16 and measuring an ion current. The flux of ions striking the end 15 of rod 16 increases when 1000 volts are applied to funnel 14. The solid line in FIG. 24 represents an ion mobility spectrum acquired by applying 1000 V to the focusing funnel while the voltage applied to an inner member of nDMA 5 was ramped from 0 volts to 1000 volts. Peaks in this mobility spectrum are assigned to fluxes of different types of ions as nDMA 5 transmitted ions of differing mobility as a consequence of the voltage applied to an inner member of nDMA 5. Relatively high mobility ions, such as the triply-charged monomer of Tocilisumab ($M^{+++}$, where M represents the triply-charged monomeric ion of Tocilisumab), strike the pedestal when a low voltage, such as 175 volts, is applied to the inner member of nDMA 5, thus allowing high mobility ions to pass through nDMA 5. A higher ramp voltage applied to the inner member of nDMA 5, allows increasingly lower mobility ions to pass through nDMA 5. It can be observed that doubly-charged monomer ($M^{++}$) ions, followed sequentially by singly-charged monomer ($M^+$), singly-charged dimer ($2M^+$) and the singly-charge trimer ($3M^+$) pass through nDMA 5 and after becoming focused by funnel 14 strike the end 15 of rod 16 as voltage applied to the inner member of nDMA 5 is ramped from a low value to a higher value. The peaks in FIG. 24 are labeled according to the type of ion they represent and in totality can be understood to represent an ion mobility spectrum.

Figure 25:
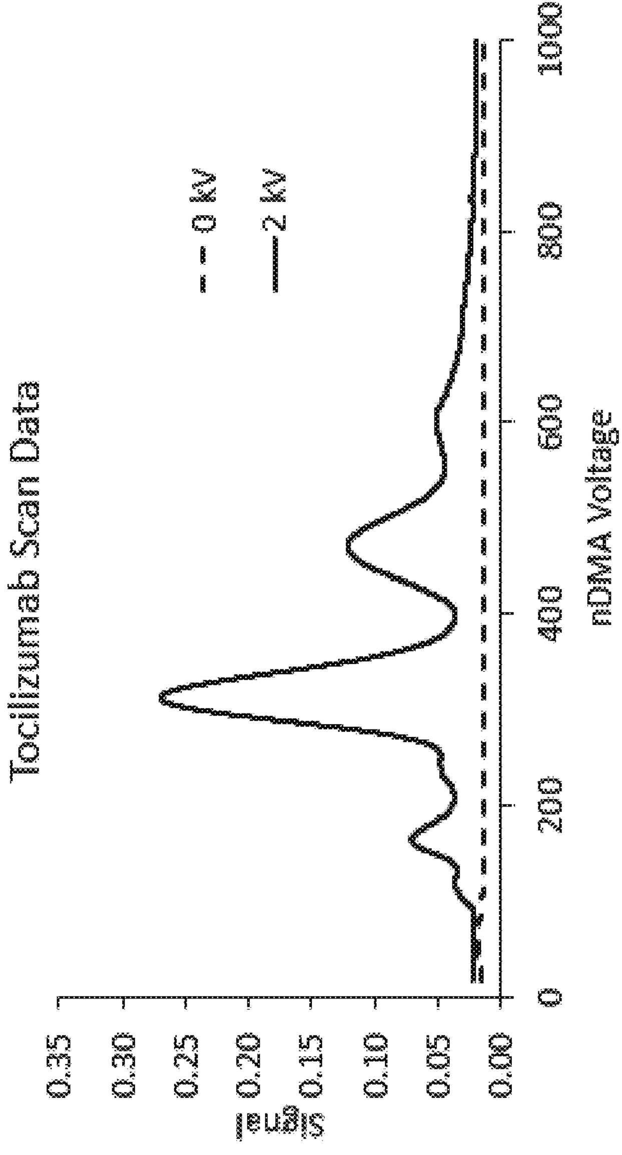
FIG. 25: Two ion mobility spectra of Tocilizumab ions, recorded while the indicated voltage was applied to the exit ring of the ion focusing funnel.
Figure 26:
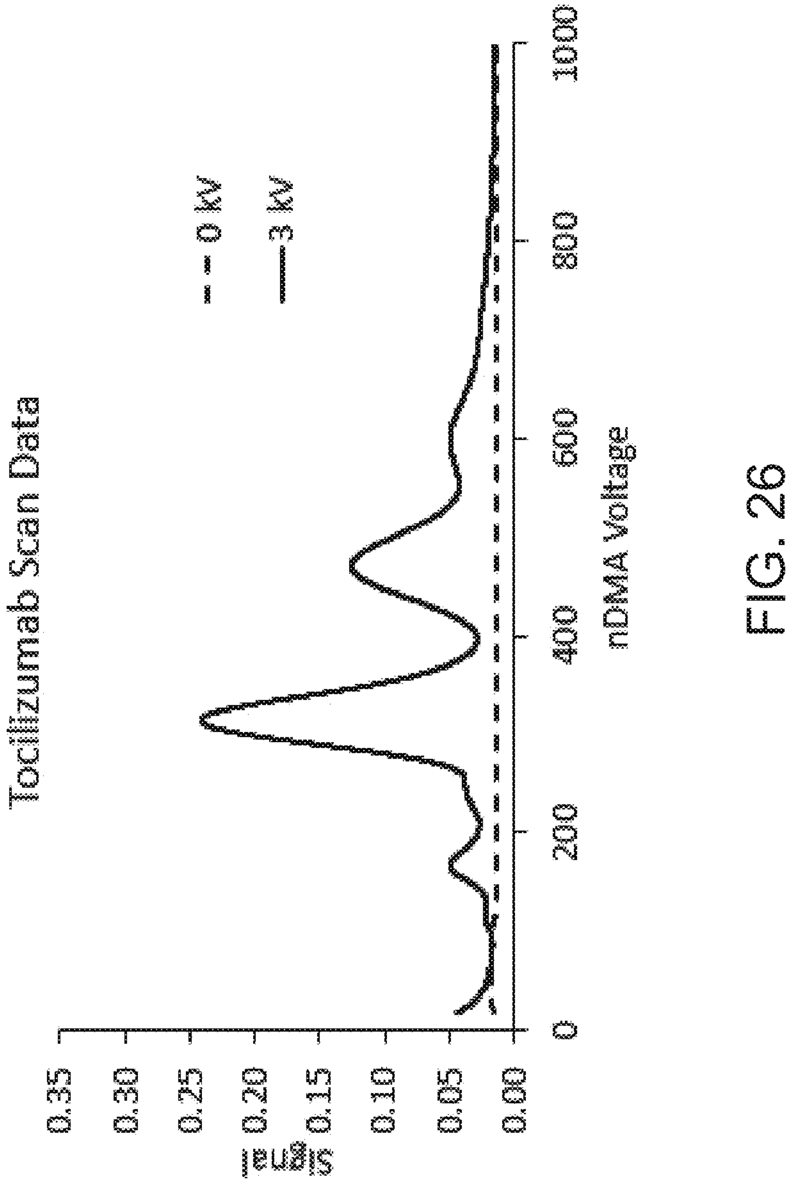
FIG. 26: Two ion mobility spectra of Tocilizumab ions, recorded while the indicated voltage was applied to the exit ring of the ion focusing funnel.
Figure 27:
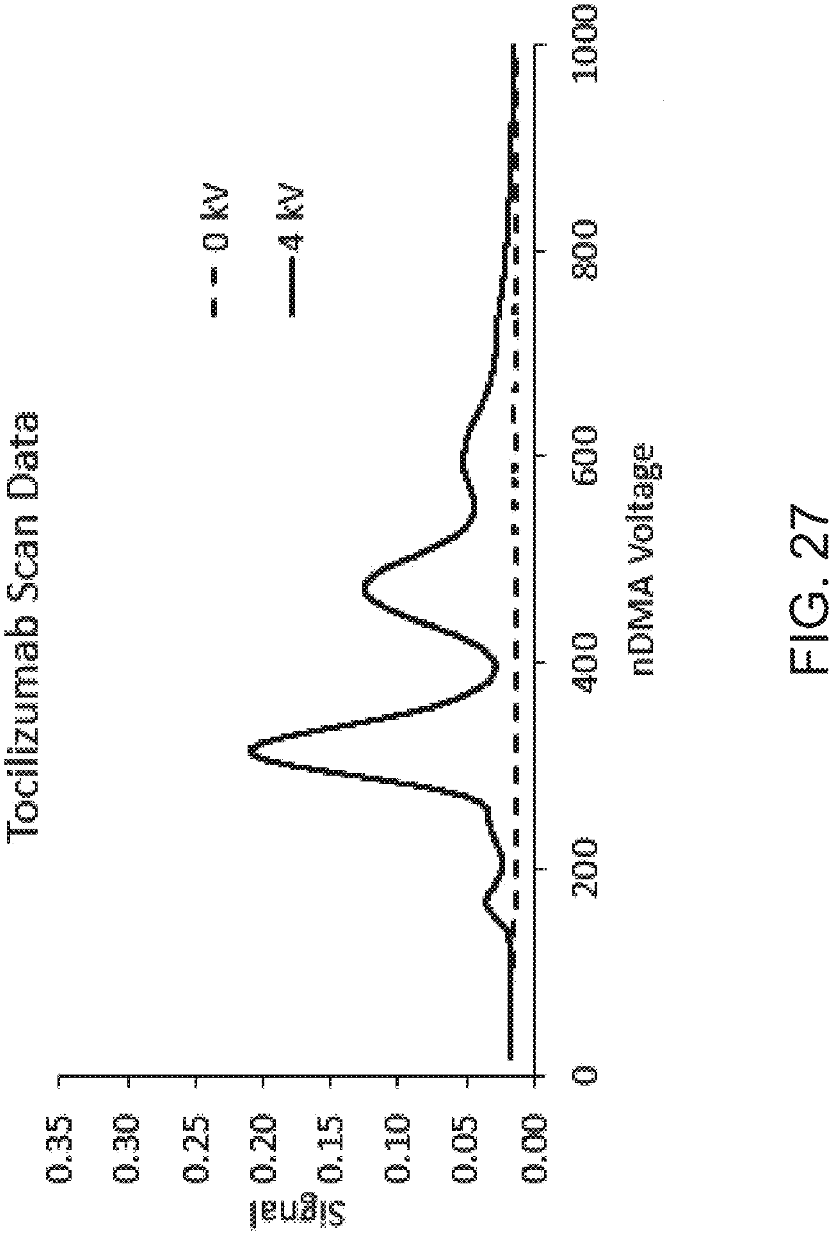
FIG. 27: Two ion mobility spectra of Tocilizumab ions, recorded while the indicated voltage was applied to the exit ring of the ion focusing funnel.
Figure 28:
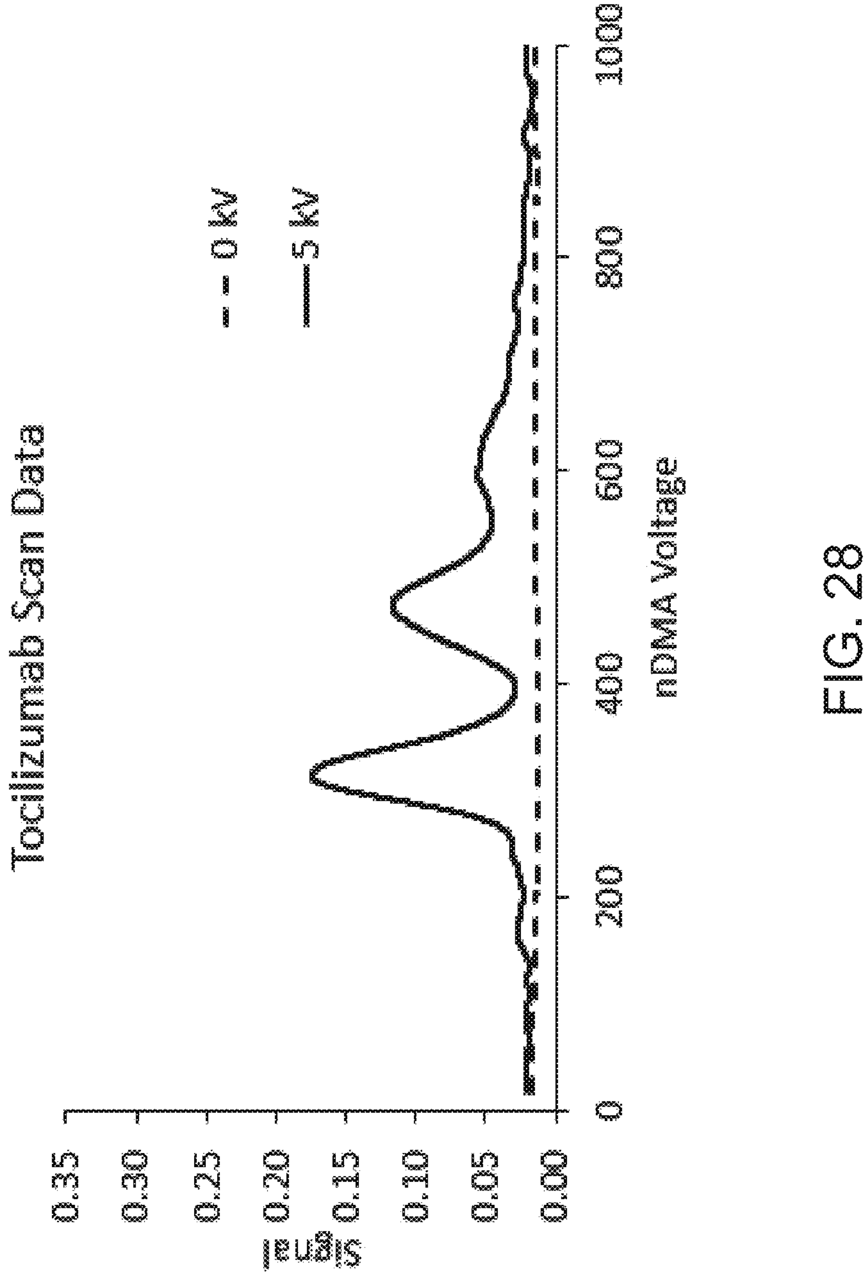
FIG. 28: Two ion mobility spectra of Tocilizumab ions, recorded while the indicated voltage was applied to the exit ring of the ion focusing funnel.

FIG. 25 shows the effect of applying 2 kV to the focusing funnel while ramping the voltage applied to the inner member of nDMA 5. Comparing the mobility spectrum in FIG. 24 to the mobility spectrum in FIG. 25, shows a smaller peaks assigned to $M^{+++}$ and $M^{++}$ ions when 2 kV is applied to funnel 14 but an increase in the heights of the $M^+$, $2M^+$ and $3M^+$ peaks. It can be understood that increasing the voltage applied to focusing funnel 14 from 1 kV to 2 kV, repelled $M^{+++}$ and $M^{++}$ ions away from the center line of funnel 14 but focused more efficiently $M^+$, $2M^+$ and 3 $M^+$ ions. FIG. 26 shows that a further increase in the voltage applied to the funnel 14 to 3 kV further increases the heights of the peaks representing $2M^+$ and $3M^+$ ions and begins to disperse $M^+$ ions, including dispersing further $M^{+++}$ and $M^{++}$ ions. FIG. 27 shows a similar trend occurs when 4 kV is applied to funnel 14. The trend continues when 5 kV is applied to funnel 14 as shown in FIG. 28.

Figure 29:
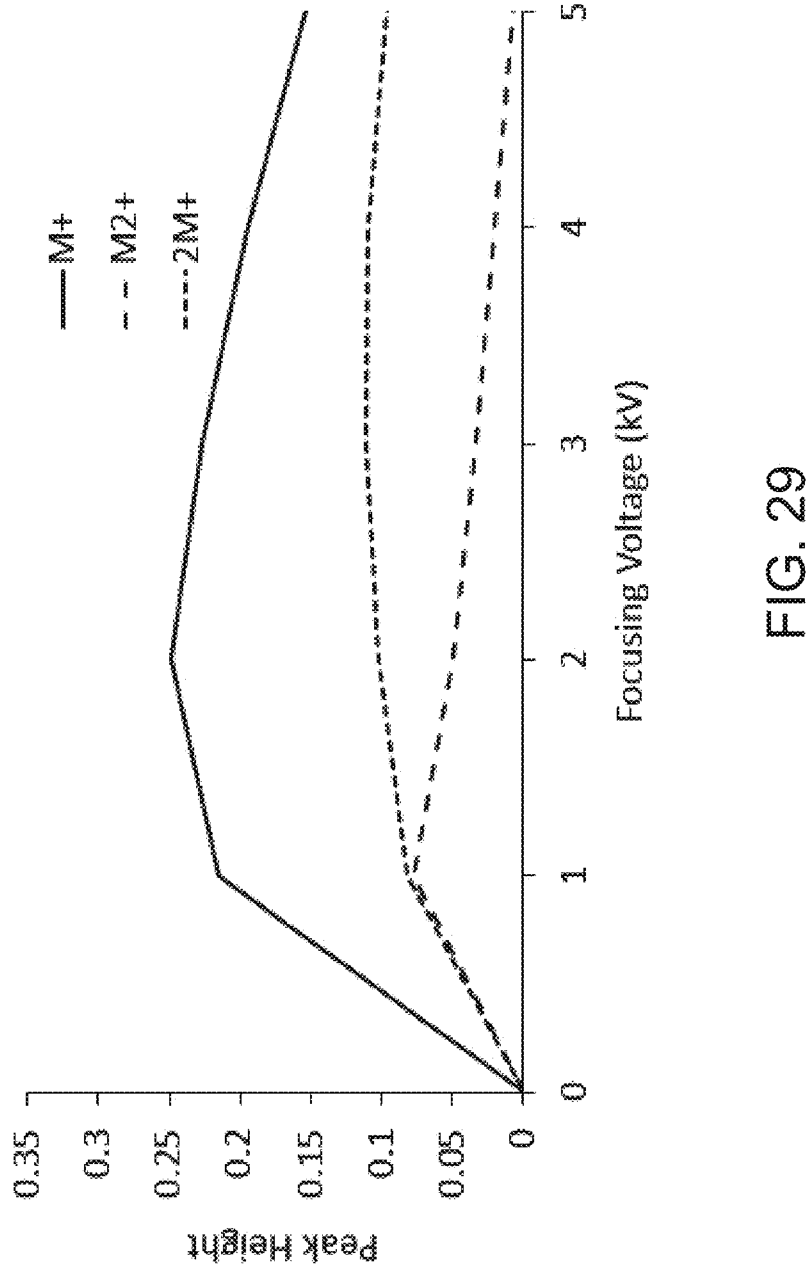
FIG. 29: Plots showing the height of mobility peaks of M+, M2+ and 2M+ peaks as a function of voltage applied to the ion focusing funnel.

A summary of the results presented in FIG. 24 through FIG. 28 is presented in FIG. 29. The three curves in FIG. 29 represent the height of ion peaks in ion mobility spectra corresponding to ion currents associated with $M^+$, $M^{++}$ and $2M^+$ ions and reveals the optimal focusing voltage is 2 kV for $M^+$ ions, a value between 3 and 4 kV optimally focuses $2M^+$ ions and 1 kV optimally for focuses $M^{++}$ ions.

It should be understood that the apparatuses described in this disclosure are not limited by depictions of preferred embodiments of the technology described in this disclosure or the ion signals displayed in FIG. 29. For example, an alternative design for the ion source could be a variable charge reducing source available from IonDX, Monterey, California. Humidifiers 12*a* and 12*b* could be substituted with thermostated water bubblers or air spargers such as a porous metal sparger from Teesing (www.teesing.com). Additionally, humidifiers 12*a* and 12*b* could be operated as chillers to produce droplets or frozen tiny ice balls.

From the description herein, it will be appreciated that the present disclosure encompasses multiple implementations of the technology which include, but are not limited to, the following:

An apparatus for preparing samples for examination by cryo-EM, the apparatus comprising an electrospray ion source and one or more of: (a) means to reduce the charge on electrospray droplets and ions; (b) a mobility filter configured to select ions having a particular conformation out of a mixture of ions; (c) a humidifier configured to control the dew point and temperature of ion-laden air; (d) an ion focusing funnel; (e) a holder for a cryo-EM grid; (f) a cooled pedestal configured to preserve the conformation of deposited ions; (g) a chamber for protecting deposited ions; and (i) means to transfer deposited ions or particles into liquid nitrogen.

The apparatus for preparing samples for examination by cryo-EM of any preceding implementation, further comprising means to reduce the charge on electrospray droplets and ions.

The apparatus for preparing samples for examination by cryo-EM of any preceding implementation, further comprising a mobility filter configured to select ions having a particular conformation out of a mixture of ions.

The apparatus for preparing samples for examination by cryo-EM of any preceding implementation, further comprising a humidifier configured to control the dew point and temperature of ion-laden air.

The apparatus for preparing samples for examination by cryo-EM of any preceding implementation, further comprising an ion focusing funnel.

The apparatus for preparing samples for examination by cryo-EM of any preceding implementation, further comprising a holder for a cryo-EM grid.

The apparatus for preparing samples for examination by cryo-EM of any preceding implementation, further comprising a cooled pedestal configured to preserve the conformation of deposited ions.

The apparatus for preparing samples for examination by cryo-EM of any preceding implementation, further comprising a chamber for protecting deposited ions.

The apparatus for preparing samples for examination by cryo-EM of any preceding implementation, further comprising means to transfer deposited ions or particles into liquid nitrogen.

The apparatus for preparing samples for examination by cryo-EM of any preceding implementation, wherein said means to reduce the charge on electrospray droplets and ions comprises a source of 210 Polonium, wherein alpha particles are released from the 210 Polonium into the electrospray droplets and ions.

The apparatus for preparing samples for examination by cryo-EM of any preceding implementation, wherein said means to reduce the charge on electrospray droplets and ions comprises a source of electrons having an energy of less than about 20 eV, wherein said electrons are released into the electrospray droplets and ions.

The apparatus for preparing samples for examination by cryo-EM of any preceding implementation, wherein the means to transfer deposited ions or particles into liquid nitrogen comprises tweezers.

An apparatus for depositing samples onto a surface for subsequent analysis, the apparatus comprising an electrospray ion source and one or more of the following: (a) means to reduce charge on electrospray droplets, ions and particles; (b) a mobility filter configured to select ions and charged particles having a particular conformation or size out of a mixture of ions and particles; (c) means to control dew point and temperature of ion-laden or particle-laden gas; (d) means to control hydration of ions and charged-particles; (e) an ion- and charged-particle focusing device; (f) means to control kinetic energy of ions and charged-particles; (g) a holder for substrates onto which ions or charged-particles are deposited; (h) means to deposit ions and charged-particles onto a substrate; (i) means to control temperature of the collection surface; (j) a chamber configured to protect deposited ions or charged-particles; (k) means for transferring deposited ions or charged-particles into ancillary analytical devices; and (l) means to preserve deposited ions or charged particles with a cryo-protectant.

The apparatus for depositing samples onto a surface for subsequent analysis of any preceding implementation, further comprising means to reduce charge on electrospray droplets, ions and particles.

The apparatus for depositing samples onto a surface for subsequent analysis of any preceding implementation, further comprising a mobility filter configured to select ions and charged particles having a particular conformation or size out of a mixture of ions and particles.

The apparatus for depositing samples onto a surface for subsequent analysis of any preceding implementation, further comprising means to control dew point and temperature of ion-laden or particle-laden gas.

The apparatus for depositing samples onto a surface for subsequent analysis of any preceding implementation, further comprising means to control hydration of ions and charged-particles.

The apparatus for depositing samples onto a surface for subsequent analysis of any preceding implementation, further comprising an ion- and charged-particle focusing device.

The apparatus for depositing samples onto a surface for subsequent analysis of any preceding implementation, further comprising means to control kinetic energy of ions and charged-particles.

The apparatus for depositing samples onto a surface for subsequent analysis of any preceding implementation, further comprising a holder for substrates onto which ions or charged-particles are deposited.

The apparatus for depositing samples onto a surface for subsequent analysis of any preceding implementation, further comprising means to deposit ions and charged-particles onto a substrate.

The apparatus for depositing samples onto a surface for subsequent analysis of any preceding implementation, further comprising means to control temperature of the collection surface.

The apparatus for depositing samples onto a surface for subsequent analysis of any preceding implementation, further comprising a chamber configured to protect deposited ions or charged-particles.

The apparatus for depositing samples onto a surface for subsequent analysis of any preceding implementation, further comprising means for transferring deposited ions or charged-particles into ancillary analytical devices.

The apparatus for depositing samples onto a surface for subsequent analysis of any preceding implementation, further comprising means to preserve deposited ions or charged particles with a cryo-protectant.

The apparatus for depositing samples onto a surface for subsequent analysis of any preceding implementation, wherein said means to reduce charge on electrospray droplets, ions and particles comprises a source of 210 Polonium, wherein alpha particles are released from the 210 Polonium into the electrospray droplets, ions and particles.

The apparatus for depositing samples onto a surface for subsequent analysis of any preceding implementation, wherein said means to reduce charge on electrospray droplets, ions and particles comprises a source of electrons having an energy of less than about 20 eV, wherein said electrons are released into the electrospray droplets, ions and particles.

The apparatus for depositing samples onto a surface for subsequent analysis of any preceding implementation, wherein said means to control dew point of ion-laden or particle-laden gas comprises a dew point controller configured to add or remove water vapor based on heating or cooling a supply of water vapor.

The apparatus for depositing samples onto a surface for subsequent analysis of any preceding implementation, wherein said means to control temperature of ion-laden or particle-laden gas comprises a temperature controller configured to sense temperature of gas flow.

The apparatus for depositing samples onto a surface for subsequent analysis of any preceding implementation, wherein said means to control hydration of ions and charged-particles comprises a humidifier configured to hydrate ions or particles based on condensing water vapor onto ions and charged-particles.

The apparatus for depositing samples onto a surface for subsequent analysis of any preceding implementation, wherein said means to control kinetic energy of ions and charged-particles comprises a mass flow controller or a pressure controller or an electric field generator, or any combination thereof.

The apparatus for depositing samples onto a surface for subsequent analysis of any preceding implementation, wherein said means to control kinetic energy uses physical distances, gas density, and gas velocity to produce ions and charged particles having low kinetic energy, wherein separation between electrically powered electrodes affects ion energy, wherein higher gas density reduces ion velocity and thus ion energy, and wherein velocity of ion- and particle-laden gas directly influences ion kinetic energy.

The apparatus for depositing samples onto a surface for subsequent analysis of any preceding implementation, wherein said means to deposit ions and charged-particles onto a substrate comprises an ion funnel.

The apparatus for depositing samples onto a surface for subsequent analysis of any preceding implementation, wherein said means to control temperature of the collection surface comprises a temperature controller.

The apparatus for depositing samples onto a surface for subsequent analysis of any preceding implementation, wherein said means for transferring deposited ions or charged-particles into ancillary analytical devices, comprises tweezers.

The apparatus for depositing samples onto a surface for subsequent analysis of any preceding implementation, wherein said means to preserve deposited ions or charged particles with a cryo-protectant comprises a refrigeration source.

The apparatus for depositing samples onto a surface for subsequent analysis of any preceding implementation, wherein said mobility filter comprises a nano-differential mobility analyzer.

A system for depositing samples onto a surface for subsequent analysis, the apparatus comprising an electrospray source and one or more of the following: (a) a source of 210 Polonium, wherein alpha particles are released from the 210 Polonium into electrospray droplets, ions and particles, or a source of electrons having an energy of less than about 20 eV, wherein said electrons are released into the electrospray droplets, ions and particles; (b) a mobility filter comprising a nano differential mobility analyzer; (c) a temperature controller and dew point controller configured to control temperature and dew point of ion and particle flow streams wherein temperature control is based sensing gas flow temperature and wherein dew point control is provided by adding or removing water vapor based on heating or cooling a supply of water vapor; (d) a humidifier configured to hydrate ions or particles based on condensing water vapor onto ions and charged particles; (e) an ion funnel configured to increase flux of ions and charged particles so as to minimize time needed to deposit a predetermined number of ions or particles; (f) a mass flow controller or a pressure controller or an electric field generator, or any combination thereof, configured to control kinetic energy using physical distances, gas density, and gas velocity to produce ions and charged particles having low kinetic energy, wherein separation between electrically powered electrodes affects ion energy, wherein higher gas density reduces ion velocity and thus ion energy, and wherein velocity of ion- and particle-laden gas directly influences ion kinetic energy; (g) a holder configured to support a collection surface; (h) an ion deposition device configured to use and control of electric fields, gas density and gas velocity for guiding ions and charged particles to strike the collection surface; (i) an optional temperature controller configured to control temperature of the collection surface and collected ions and particles during the time they are collected; (j) an optional temperature controller configured to control temperature of collected ions and particles after they are collected; (k) a transfer stage or instrument for moving the collected particles out of the holder and into an ancillary analytical instrument of storage container; (l) an optional temperature controller configured to control temperature of the collected ions and particles while the collected particles are transferred to alternative analytical devices; and (m) a transfer stage or instrument for transferring the collected particles into a long-term storage container, such as a liquid-nitrogen dewar. during the time they are collected during the time they are collected.

The system for depositing samples onto a surface for subsequent analysis of any preceding implementation, further comprising a source of 210 Polonium, wherein alpha particles are released from the 210 Polonium into electrospray droplets, ions and particles, or a source of electrons having an energy of less than about 20 eV, wherein said electrons are released into the electrospray droplets, ions and particles.

The system for depositing samples onto a surface for subsequent analysis of any preceding implementation, further comprising a mobility filter comprising a nano differential mobility analyzer.

The system for depositing samples onto a surface for subsequent analysis of any preceding implementation, further comprising a temperature controller and dew point controller configured to control temperature and dew point of ion and particle flow streams wherein temperature control is based sensing gas flow temperature and wherein dew point control is provided by adding or removing water vapor based on heating or cooling a supply of water vapor.

The system for depositing samples onto a surface for subsequent analysis of any preceding implementation, further comprising a humidifier configured to hydrate ions or particles based on condensing water vapor onto ions and charged particles.

The system for depositing samples onto a surface for subsequent analysis of any preceding implementation, further comprising an ion funnel configured to increase flux of ions and charged particles so as to minimize time needed to deposit a predetermined number of ions or particles.

The system for depositing samples onto a surface for subsequent analysis of any preceding implementation, further comprising a mass flow controller or a pressure controller or an electric field generator, or any combination thereof, configured to control kinetic energy using physical distances, gas density, and gas velocity to produce ions and charged particles having low kinetic energy, wherein separation between electrically powered electrodes affects ion energy, wherein higher gas density reduces ion velocity and thus ion energy, and wherein velocity of ion- and particle-laden gas directly influences ion kinetic energy.

The system for depositing samples onto a surface for subsequent analysis of any preceding implementation, further comprising a holder configured to support a collection surface.

The system for depositing samples onto a surface for subsequent analysis of any preceding implementation, further comprising an ion deposition device configured to use and control of electric fields, gas density and gas velocity for guiding ions and charged particles to strike the collection surface.

The system for depositing samples onto a surface for subsequent analysis of any preceding implementation, further comprising an optional temperature controller configured to control temperature of the collection surface and collected ions and particles during the time they are collected.

The system for depositing samples onto a surface for subsequent analysis of any preceding implementation, further comprising an optional temperature controller configured to control temperature of collected ions and particles after they are collected.

The system for depositing samples onto a surface for subsequent analysis of any preceding implementation, further comprising a transfer stage or instrument for moving the collected particles out of the holder and into an ancillary analytical instrument of storage container.

The system for depositing samples onto a surface for subsequent analysis of any preceding implementation, further comprising an optional temperature controller configured to control temperature of the collected ions and particles while the collected particles are transferred to alternative analytical devices.

The system for depositing samples onto a surface for subsequent analysis of any preceding implementation, further comprising a transfer stage or instrument for transferring the collected particles into a long-term storage container, such as a liquid-nitrogen dewar. during the time they are collected during the time they are collected.

A method comprising preparing samples for examination by cryo-EM using the apparatus or system of any preceding implementation.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Ion mass, kDa | Ion charge, z | Vx | Funnel voltages | KE (eV) at impact |
|---|---|---|---|---|
| 150 | 1 | 0.5 | 0 | 0.00019 |
| 300 | 1 | 0.5 | 4000, 3200, 2400, 1600, 800 | 0.0015 |
| 150 | 1 | 0.5 | 4000, 3200, 2400, 1600, 800 | 0.0012 |
| 150 | 2 | 0.5 | 4000, 3200, 2400, 1600, 800 | x |
| 150 | 3 | 0.5 | 4000, 3200, 2400, 1600, 800 | x |
| 150 | 3 | 0.5 | 1000, 800, 600, 400, 200 | 0.00091 |
| 150 | 2 | 0.5 | 1000, 800, 600, 400, 200 | 0.00055 |
| 150 | 1 | 0.5 | 1000, 800, 600, 400, 200 | 0.00035 |
| 300 | 1 | 0.5 | 1000, 800, 600, 400, 200 | 0.00058 |
| 150 | 1 | 0.5 | 6500, 5200, 3900, 2600, 1300 | 0.0027 |
| 150 | 1 | 1 | 4000, 3200, 2400, 1600, 800 | 0.0025 |
| 150 | 1 | 10 | 4000, 3200, 2400, 1600, 800 | 0.090 |

What is claimed is:

1. An apparatus for preparing samples for examination by cryo-EM, the apparatus comprising:

(a) an electrospray ion source;

(b) means to reduce the charge on electrospray droplets and ions;

(c) a mobility filter configured to select ions having a particular conformation out of a mixture of ions;

(d) a humidifier configured to control the dew point and temperature of ion-laden air;

(e) an ion focusing funnel;

(f) a holder for a cryo-EM grid;

(g) a cooled pedestal configured to preserve the conformation of deposited ions;

(h) a chamber for protecting deposited ions; and (i) means to transfer deposited ions or particles into liquid nitrogen.

2. The apparatus of claim 1, wherein said means to reduce the charge on electrospray droplets and ions comprises a source of 210 Polonium, wherein alpha particles are released from the 210 Polonium into the electrospray droplets and ions.

3. The apparatus of claim 1, wherein said means to reduce the charge on electrospray droplets and ions comprises a source of electrons having an energy of less than about 20 eV, wherein said electrons are released into the electrospray droplets and ions.

4. The apparatus of claim 1, wherein the means to transfer deposited ions or particles into liquid nitrogen comprises tweezers.

5. An apparatus for depositing samples onto a surface for subsequent analysis, the apparatus comprising:

(a) an electrospray ion source;

(b) means to reduce charge on electrospray droplets, ions and particles;

(c) a mobility filter configured to select ions and charged particles having a particular conformation or size out of a mixture of ions and particles;

(d) means to control dew point and temperature of ion-laden or particle-laden gas;

(e) means to control hydration of ions and charged-particles;

(f) an ion- and charged-particle focusing device;

(g) means to control kinetic energy of ions and charged-particles;

(h) a holder for substrates onto which ions or charged-particles are deposited;

(i) means to deposit ions and charged-particles onto a substrate;

(j) means to control temperature of the collection surface;

(k) a chamber configured to protect deposited ions or charged-particles;

(l) means for transferring deposited ions or charged-particles into ancillary analytical devices; and (m) means to preserve deposited ions or charged particles with a cryo-protectant.

6. The apparatus of claim 5, wherein said means to reduce charge on electrospray droplets, ions and particles comprises a source of 210 Polonium, wherein alpha particles are released from the 210 Polonium into the electrospray droplets, ions and particles.

7. The apparatus of claim 5, wherein said means to reduce charge on electrospray droplets, ions and particles comprises a source of electrons having an energy of less than about 20 eV, wherein said electrons are released into the electrospray droplets, ions and particles.

8. The apparatus of claim 5, wherein said means to control dew point of ion-laden or particle-laden gas comprises a dew point controller configured to add or remove water vapor based on heating or cooling a supply of water vapor.

9. The apparatus of claim 5, wherein said means to control temperature of ion-laden or particle-laden gas comprises a temperature controller configured to sense temperature of gas flow.

10. The apparatus of claim 5, wherein said means to control hydration of ions and charged-particles comprises a humidifier configured to hydrate ions or particles based on condensing water vapor onto ions and charged-particles.

11. The apparatus of claim 5, wherein said means to control kinetic energy of ions and charged-particles comprises a mass flow controller or a pressure controller or an electric field generator, or any combination thereof.

12. The apparatus of claim 11, wherein said means to control kinetic energy uses physical distances, gas density, and gas velocity to produce ions and charged particles having low kinetic energy, wherein separation between electrically powered electrodes affects ion energy, wherein higher gas density reduces ion velocity and thus ion energy, and wherein velocity of ion- and particle-laden gas directly influences ion kinetic energy.

13. The apparatus of claim 5, wherein said means to deposit ions and charged-particles onto a substrate comprises an ion funnel.

14. The apparatus of claim 5, wherein said means to control temperature of the collection surface comprises a temperature controller.

15. The apparatus of claim 5, wherein said means for transferring deposited ions or charged-particles into ancillary analytical devices, comprises tweezers.

16. The apparatus of claim 5, wherein said means to preserve deposited ions or charged particles with a cryo-protectant comprises a refrigeration source.

17. The apparatus of claim 5, wherein said mobility filter comprises a nano-differential mobility analyzer.

18. An apparatus for depositing samples onto a surface for subsequent analysis, the apparatus comprising:

(a) an electrospray source;

(b) a source of 210 Polonium, wherein alpha particles are released from the 210 Polonium into electrospray droplets, ions and particles, or a source of electrons having an energy of less than about 20 eV, wherein said electrons are released into the electrospray droplets, ions and particles;

(c) a mobility filter comprising a nano differential mobility analyzer;

(d) a temperature controller and dew point controller configured to control temperature and dew point of ion and particle flow streams wherein temperature control is based sensing gas flow temperature and wherein dew point control is provided by adding or removing water vapor based on heating or cooling a supply of water vapor;

(e) a humidifier configured to hydrate ions or particles based on condensing water vapor onto ions and charged particles;

(f) an ion funnel configured to increase flux of ions and charged particles so as to minimize time needed to deposit a predetermined number of ions or particles;

(g) a mass flow controller or a pressure controller or an electric field generator, or any combination thereof, configured to control kinetic energy using physical distances, gas density, and gas velocity to produce ions and charged particles having low kinetic energy, wherein separation between electrically powered electrodes affects ion energy, wherein higher gas density reduces ion velocity and thus ion energy, and wherein velocity of ion- and particle-laden gas directly influences ion kinetic energy;

(h) a holder configured to support a collection surface;

(i) an ion deposition device configured to use and control of electric fields, gas density and gas velocity for guiding ions and charged particles to strike the collection surface;

(j) an optional temperature controller configured to control temperature of the collection surface and collected ions and particles during the time they are collected;

(k) an optional temperature controller configured to control temperature of collected ions and particles after they are collected;

(l) a transfer stage or instrument for moving the collected particles out of the holder and into an ancillary analytical instrument of storage container;

(m) an optional temperature controller configured to control temperature of the collected ions and particles while the collected particles are transferred to alternative analytical devices; and (o) a transfer stage or instrument for transferring the collected particles into a long-term storage container, such as a liquid-nitrogen dewar during the time they are collected.

19. A method comprising preparing samples for examination by cryo-EM using the apparatus of any of claims 1 through 18.

* * * * *